US010836407B2

(12) United States Patent
Veitch

(10) Patent No.: US 10,836,407 B2
(45) Date of Patent: Nov. 17, 2020

(54) SYSTEM AND METHOD FOR INSPECTING A RAIL

(71) Applicant: Sperry Rail Holdings, Inc., Danbury, CT (US)

(72) Inventor: Alastair James Veitch, Derby (GB)

(73) Assignee: SPERRY RAIL HOLDINGS, INC., Danbury, CT (US)

( * ) Notice: Subject to any disclaimer, the term of this patent is extended or adjusted under 35 U.S.C. 154(b) by 281 days.

(21) Appl. No.: 15/825,589

(22) Filed: Nov. 29, 2017

(65) Prior Publication Data
US 2019/0161095 A1    May 30, 2019

(51) Int. Cl.
| B61D 15/12 | (2006.01) |
| B61K 9/10 | (2006.01) |
| G01N 21/956 | (2006.01) |
| G01N 29/265 | (2006.01) |
| G01N 29/22 | (2006.01) |
| B61K 9/08 | (2006.01) |
| G01N 29/24 | (2006.01) |
| B61L 15/00 | (2006.01) |

(52) U.S. Cl.
CPC .............. B61D 15/12 (2013.01); B61K 9/08 (2013.01); B61K 9/10 (2013.01); B61L 15/0081 (2013.01); G01N 21/956 (2013.01); G01N 29/225 (2013.01); G01N 29/2493 (2013.01); G01N 29/265 (2013.01); G01N 2291/2623 (2013.01)

(58) Field of Classification Search
CPC ................................... B61K 9/08; B61K 9/10
See application file for complete search history.

(56) References Cited

U.S. PATENT DOCUMENTS

| 3,028,751 A | 4/1962 | Joy |
| 4,044,594 A | 8/1977 | Owens et al. |
| 4,235,112 A * | 11/1980 | Kaiser .................. G01N 29/223 367/96 |
| 5,339,692 A * | 8/1994 | Shoenhair ............ G01N 29/223 73/636 |
| 6,161,064 A | 12/2000 | Strasser et al. |
| 6,516,668 B2 * | 2/2003 | Havira ..................... B61K 9/10 73/634 |
| 6,594,591 B2 | 7/2003 | Clark et al. |

(Continued)

OTHER PUBLICATIONS

International Search Report and Written Opinion for International Application No. PCT/US18/62733 dated Jan. 31, 2019; 15 pgs.

*Primary Examiner* — Leslie J Evanisko
*Assistant Examiner* — Leo T Hinze
(74) *Attorney, Agent, or Firm* — Cantor Colburn LLP

(57) ABSTRACT

A system and method for inspecting a rail is provided. The system includes an ultrasonic transducer positioned to emit an ultrasonic beam onto the rail and receive a refraction beam, the ultrasonic transducer being movable between a first position and a second position. A sensor is operable to measure an angle of a carriage, the carriage being positioned on the rail. A controller is operably coupled to the sensor, the controller having a processor that is responsive to executable computer instructions when executed on the processor to cause the ultrasonic transducer to move to receive refraction beam in response to the measured angle indicating a rail radius of less than a predetermined first threshold.

20 Claims, 20 Drawing Sheets

Typical Curved Track Rail Head Shape

(56) References Cited

U.S. PATENT DOCUMENTS

| | | | | |
|---|---|---|---|---|
| 7,659,972 B2* | 2/2010 | Magnus | ................... | B61K 9/08 |
| | | | | 356/237.1 |
| 2009/0073428 A1 | 3/2009 | Magnus et al. | | |
| 2013/0047729 A1* | 2/2013 | Wigh | ................... | G01N 29/043 |
| | | | | 73/636 |

* cited by examiner

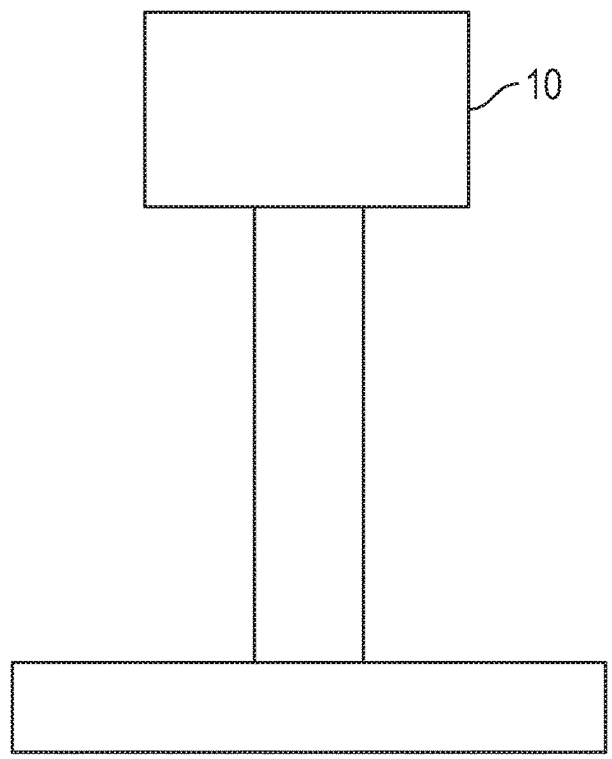
FIG. 1
(Prior Art)
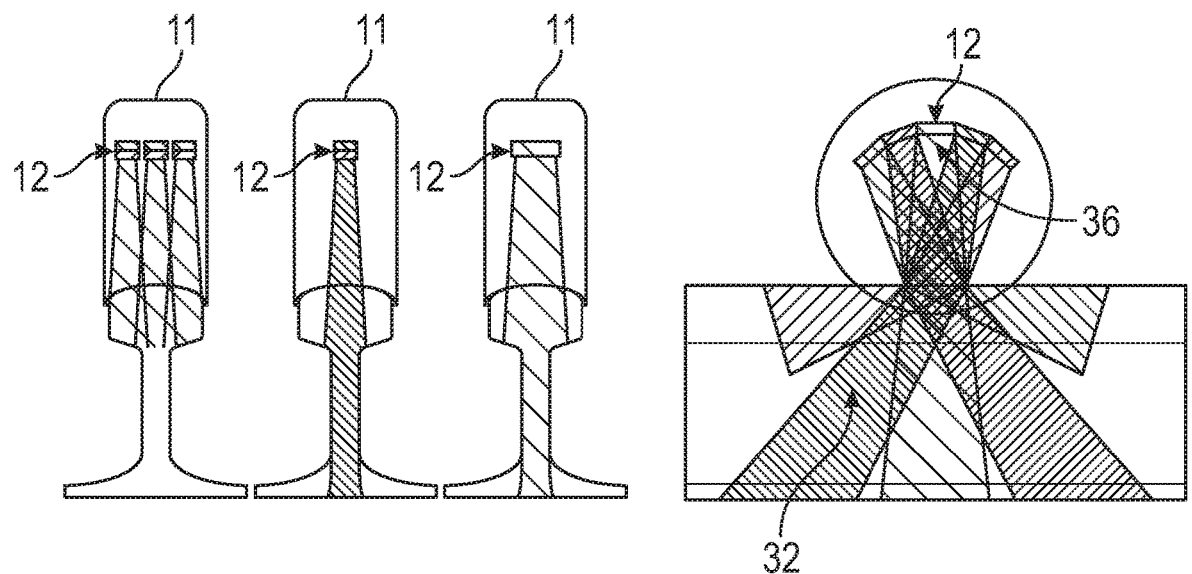
FIG. 2A
(Prior Art)
FIG. 2B
(Prior Art)

Bogie End View

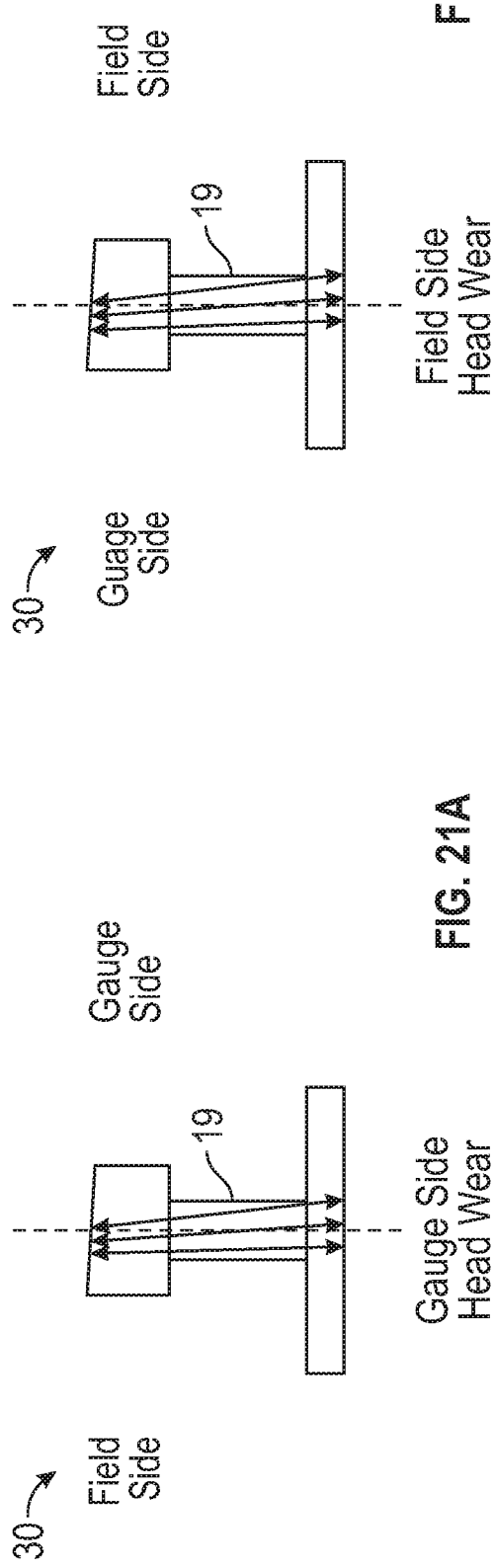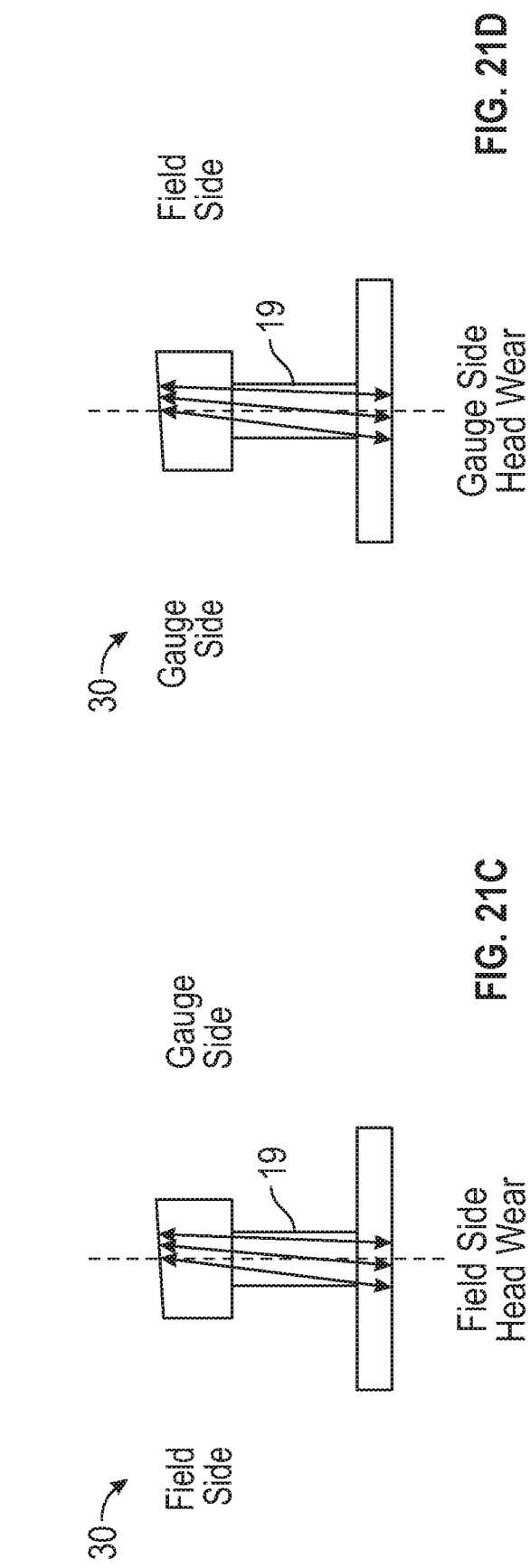

SYSTEM AND METHOD FOR INSPECTING A RAIL

BACKGROUND

The subject matter disclosed herein relates to a system and method for inspecting a rail, and in particular to a system and method that automatically compensates a sensor based on a radius of curvature of the rail.

Railroad inspection typically involves the use of ultrasonic sensors, electromagnetic magnetic sensors, vision sensors, or a combination there of.

The primary internal rail inspection methodology normally employs ultrasonic waves to inspect the majority of the internal structure of the rail and this sensor technology is typically deployed from the upper surface of the rail head 10 (FIG. 1) using either ultrasonic probes 12 mounted inside fluid filled wheel probes 11 (FIG. 2A-2C) or direct contact slider probes 13 (FIG. 3). In the case of wheel probe deployment the ultrasonic transducers are typically mounted in pliable wheels 11 that ride over the upper surface of the rail head 10 (FIG. 1). These wheels 11 are filled with a coupling fluid so that the transducers 12 mounted inside can send ultrasonic signals through the pliable wheel membrane and then into the rail using water as a coupling medium. The return signals are processed and used to map the locations of flaws in the rail.

While the prior art rail inspection method utilizes ultrasound, this can also be supplemented by the use of various other electromagnetic inspection techniques such as DC Induction or AC Eddy Current inspection systems and the sensors employed in these techniques again are normally applied for the top surface of the rail head, with the sensors being mounted in either slider or fluid filled wheel probes. Both of the electromagnetic inspection processors involve the injection of a current into the head of the rail, in the case of the DC Induction inspection system this involves the injection of a large direct current into the rail using two sets of contacts or brushes and in the case of the AC Eddy Current inspection system this involves coupling high frequency AC energy into the upper surface of the rail head. Discontinuities in the railhead section cause a disturbance of the current flowing through the railhead and these are detected by the sensors that are located on the rail head, with the a sensors head that responds to the accompanying magnetic field disturbance. Perturbations in the magnetic field around the railhead are detected as induced voltages in the electromagnetic sensors/search coils in the sensing head. The induced voltages produce signal currents that may be processed or displayed to an operator.

Common to all the above prior art inspection/sensing techniques is the desire to accurately/reliably maintain the lateral position the of the various sensors elements (ultrasonic and/or electromagnetic) over the top surface of rail. In the case of the ultrasonic sensors it is desired to maintain their lateral position to within +/−1 mm of the ultrasonic center line of the rail.

Normally the sensors elements detailed above are mounted to a mobile rail inspection vehicle 14 (FIG. 4) and these inspection vehicles are at times required to inspect rail at speeds in excess of 80 kph (50 mph). Typically to provide some method of guiding the inspection sensors reliably over the top of the rail head 10, the sensors are typically mounted from either an adapted bogie 16 (FIG. 5), a under vehicle supported test carriage (FIG. 6) or a gauging axle 17 (FIG. 7). However, in most cases the mechanical guidance, such as a lateral compensation system 18 provided is not enough to maintain the required lateral accuracy of +/−1 mm for the ultrasonic probes to be able to maintain the ultrasonic center line of rail (FIG. 8). This issue is further compounded when the effects of rail head 10 wear (FIG. 9A, FIG. 9B) are taken into consideration in very tight curves (>1000 m radius).

One issue that arises with the use of ultrasonic transducers occurs on curved sections of the rail. It has been found that the top surface of curved rail sections wear in a manner that causes the ultrasonic beam 19 to be refracted away from the rail center line as shown in FIG. 9B. For rails with a curvature less than 1000 meters, the refraction of the ultrasonic beam 19 may be significant enough in some instances to cause the return signal to miss the zero-degree ultrasonic probe. This issue become worse as the radius decreases. To address this issue, existing inspection systems may include lateral compensation assemblies 18 (FIG. 7) include a manual control that allows the operator to shift the position of the ultrasonic probe to allow measurement of the return signal.

Accordingly, while existing rail inspection systems are suitable for their intended purpose the need for improvement remains, particularly in providing a system and method of inspecting rails without requiring operator manual intervention.

BRIEF DESCRIPTION

According to one aspect of the disclosure, a system for inspecting a rail is provided. The system includes an ultrasonic transducer positioned to emit an ultrasonic beam onto the rail and receive a refraction beam, the ultrasonic transducer being movable between a first position and a second position. A sensor is operable to measure an angle of a carriage, the carriage being positioned on the rail. A controller is operably coupled to the sensor, the controller having a processor that is responsive to executable computer instructions when executed on the processor to cause the ultrasonic transducer to move to receive refraction beam in response to the measured angle indicating a rail radius of less than a predetermined first threshold.

According to another aspect of the disclosure a method of inspecting a rail is provided. The method includes transmitting an ultrasonic beam into the rail with an ultrasonic transducer, the ultrasonic transducer being coupled to a carriage. A refraction beam reflected from the rail is received at the ultrasonic transducer. A change in angle of the carriage is measured relative to a horizontal plane. The ultrasonic transducer is moved relative to the rail based at least in part on the change in angle.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a cross sectional view of a rail showing the top surface of the rail head where the signals from ultrasonic and electromagnetic sensors pass in and out of the internal structure of the rail according to an embodiment of the invention;

FIG. 2A, 2B and FIG. 2C are views of a rail and the deployment of a Wheel Probe/Roller Search Unit (RSU) according to an embodiment of the invention;

FIG. 21A, 21B, 21C and FIG. 21D illustrate schematic examples of rail head wear effect on the zero degree beam and compensation for the position of the probes have been adjusted based on the adaptive guidance systems according to an embodiment of the invention;

The detailed description explains embodiments of the disclosure, together with advantages and features, by way of example with reference to the drawings.

DETAILED DESCRIPTION

Embodiments of the present invention are directed to a system and method for inspecting rails, such as those used with railroad tracks. Embodiments of the present invention provide advantages in allowing for a compensation of sensors on curved sections of a rail. Further embodiments of the present invention provide advantages in automatically determining the radius of a curved rail and compensating the position of the sensor to allow inspection measurements of the rail independent of speed of a carriage to which the sensor is mounted.

Figure 10:
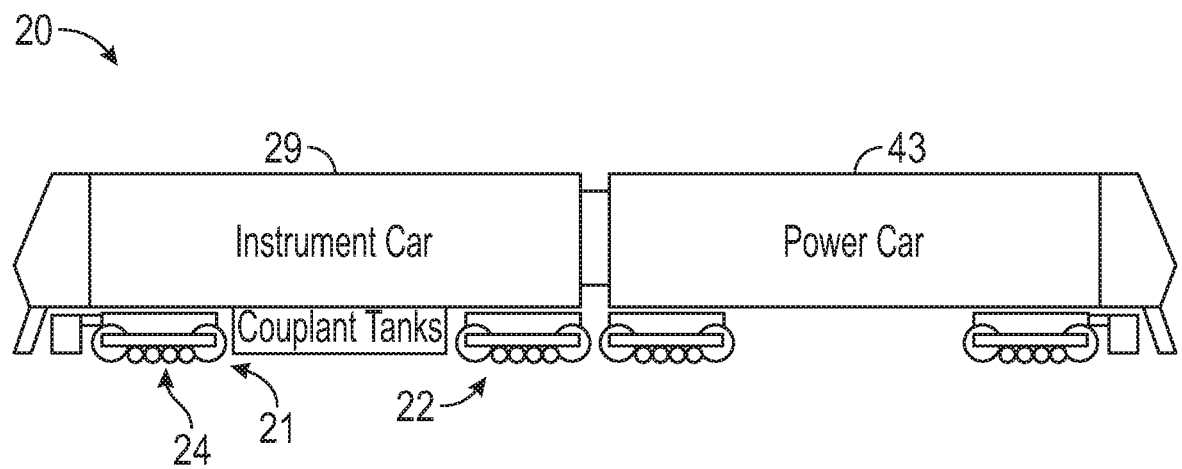
FIG. 10 provides a schematic representation of a typical rail bound mobile inspection vehicle.
Figure 11:
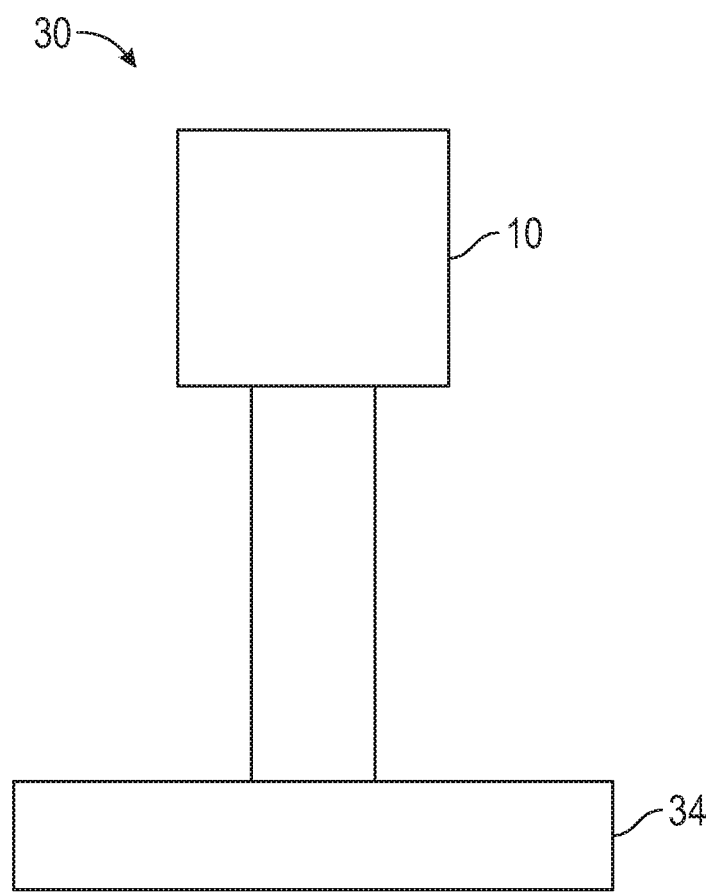
FIG. 11 provides a cross sectional view of a typical section rail indicating the upper rail head inspection zone.
Figure 12:
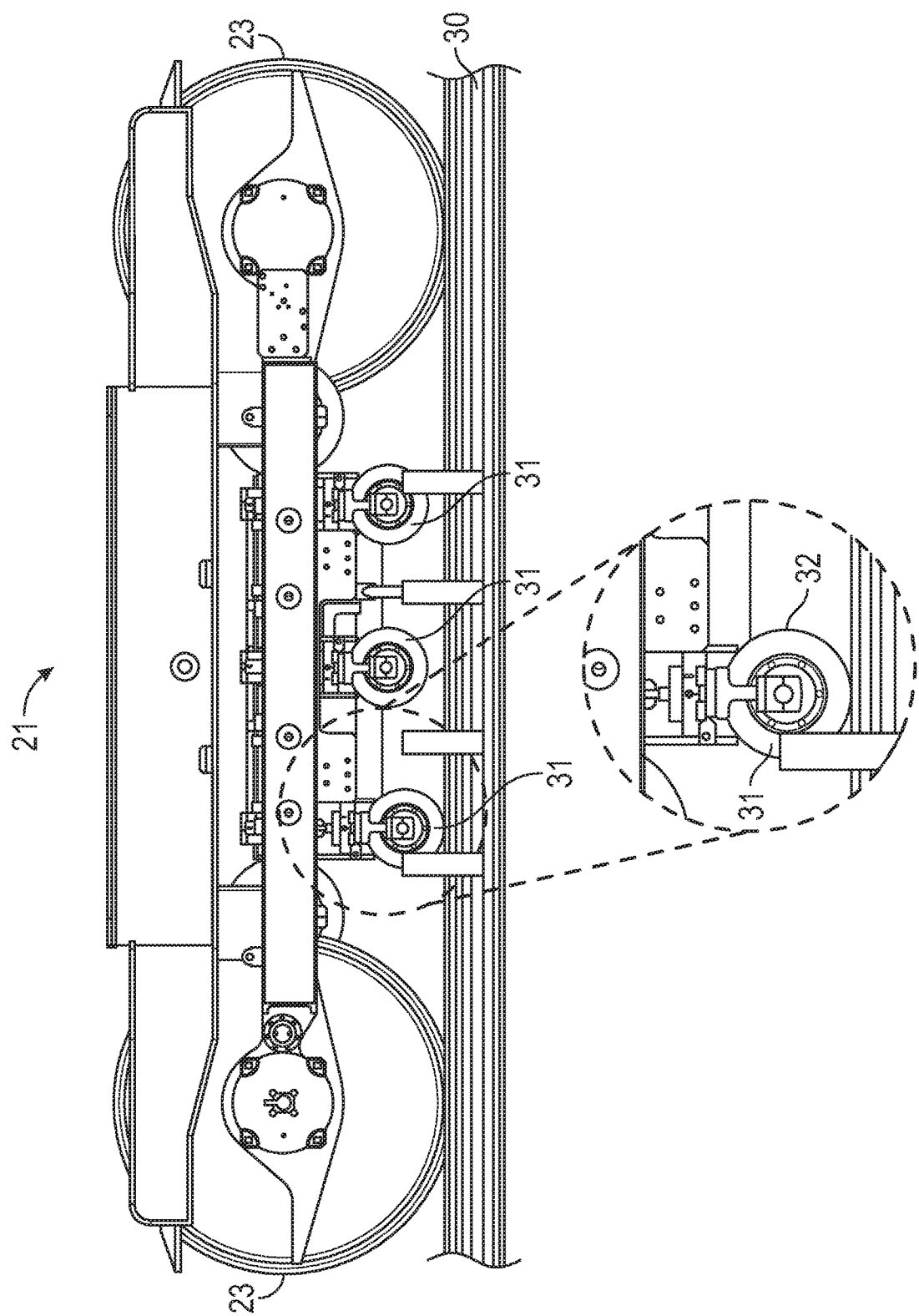
FIG. 12 provides a side view of a railway bogie which has been adapted to mount a bogie based ultrasonic RSU deployment system and indicates the typical positions of the RSU sensors according to an embodiment of the invention.

Referring now to FIG. 10, a rail inspection system 20 is shown having a bogie/test carriage 21 that has been adapted to mount various ultrasonic 24 and electromagnetic sensors 22 that are used to inspect the railroad rails as the vehicle transits over them. It should be appreciated that while the illustrated embodiment bogie 21 is mounted under a railway instrument vehicle 29 coupled to a railway power vehicle 43 as a semi-automatic rail bound test carriage, this is for exemplary purposes and the claims should not be so limited. In other embodiments, the carriage may include a propulsion system (e.g. an engine) and may be operated by a human operator, autonomously operated, remotely operated or a combination of the foregoing. In still further embodiments, the bogie/test carriage 21 may be moved or towed by a separate vehicle having its own propulsion system. In an embodiment, the system 20 can include both ultrasonic detector systems 24 and electro-magnetic (Induction and Eddy Current) detector system 22, the system may equally employ only the ultrasonic measurement sensors 24. All the sensors whether ultrasonic or electro-magnetic are in direct contract with uppers surface of the rail head 10 of rail 30 (FIG. 11).

Figures 13A, 13B:
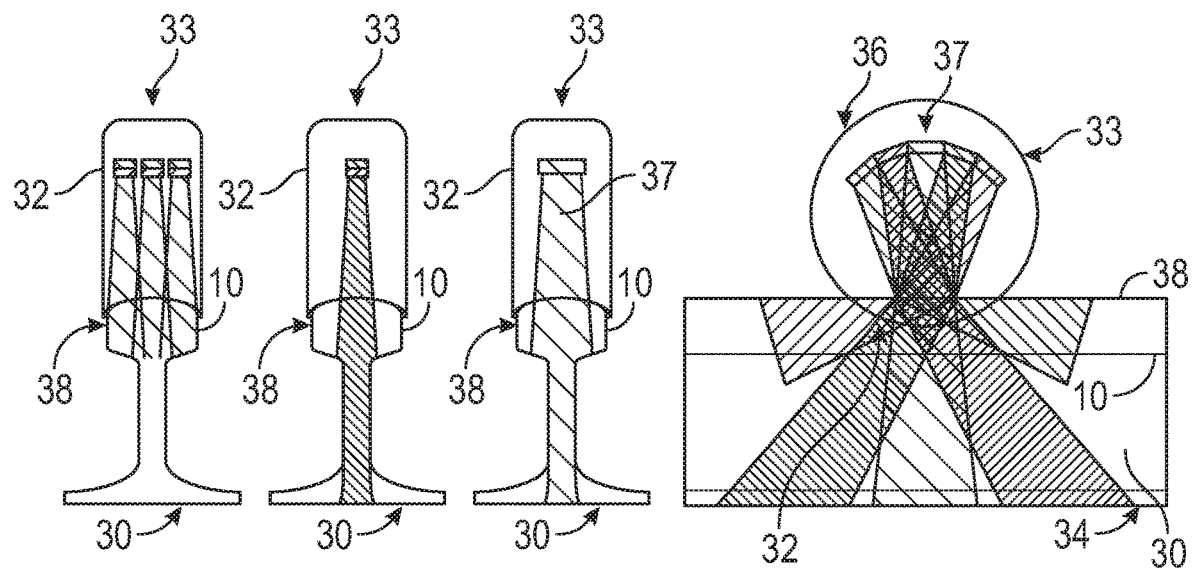
FIG. 13A, FIG. 13B and FIG. 13C are views of a rail and the deployment of a Wheel Probe/Roller Search Unit (RSU) according to an embodiment of the invention.
Figure 13C:
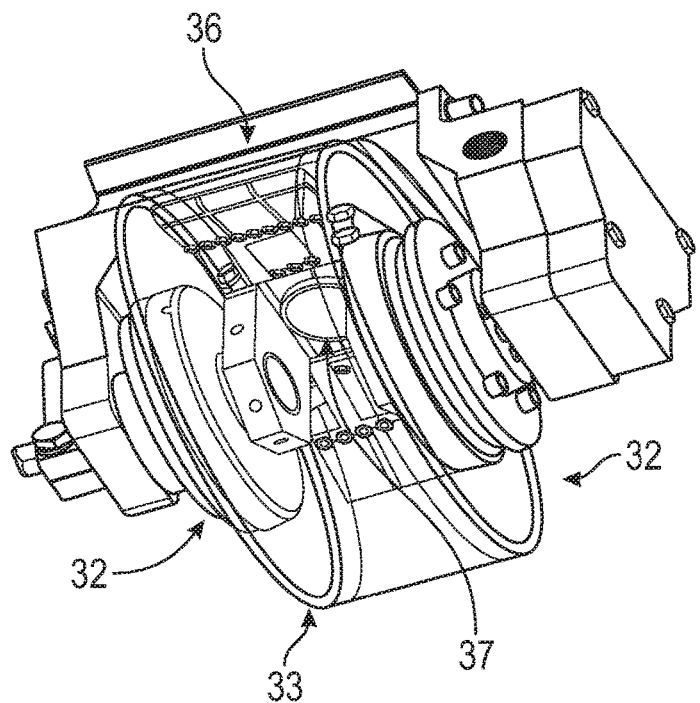
Figure 14:
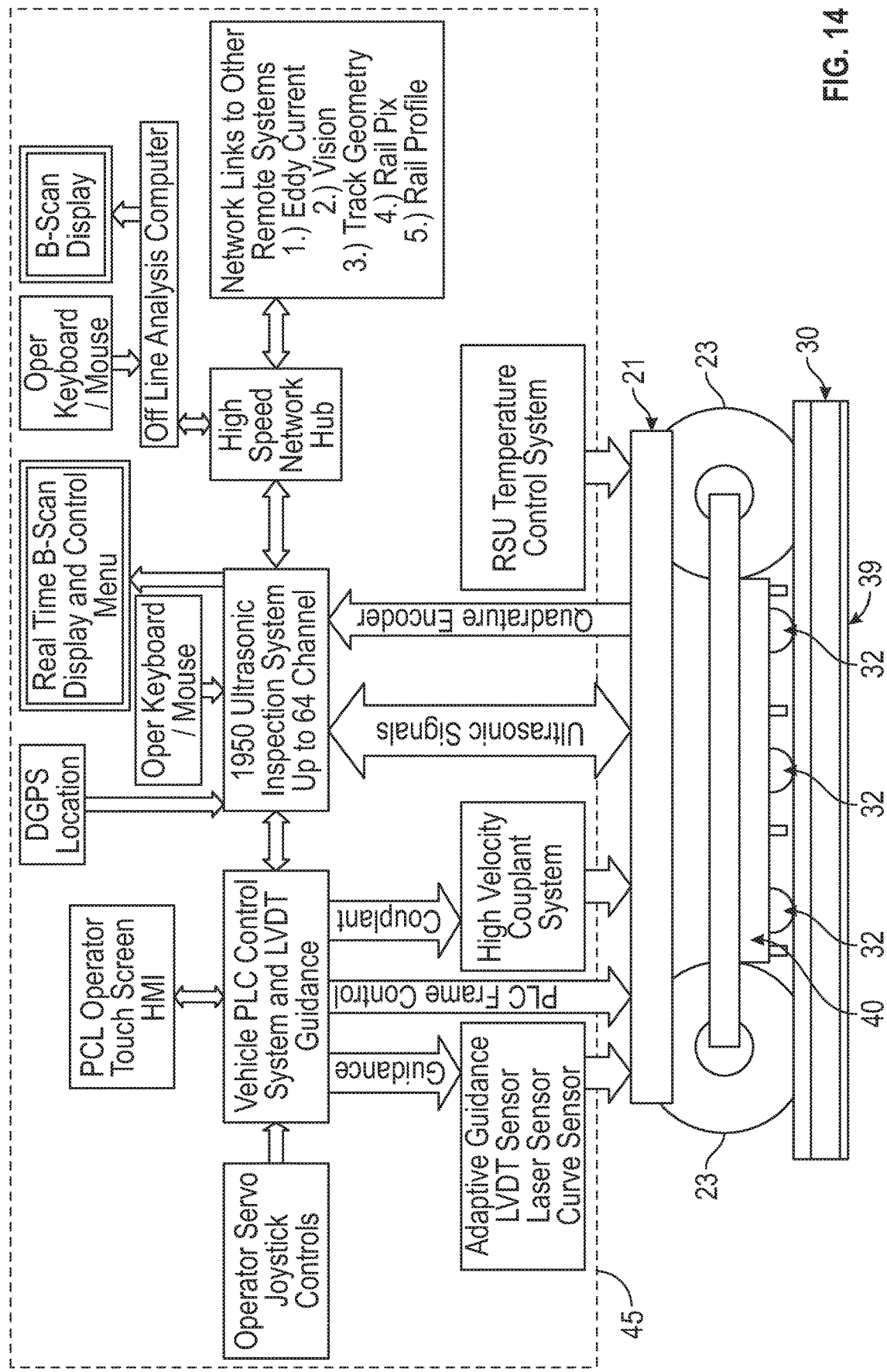
FIG. 14 is a schematic view of a mobile ultrasonic rail inspection system and this can be expanded to include other supplementary sensor technologies (Electromagnetic Induction/Eddy Current/Rail Vision) etc. according to an embodiment of the invention.

Referring now to FIG. 12 and FIG. 13A-13C, the bogie/test carriage 21 further includes an ultrasonic sensor system that includes one or more roller search units (RSUs) 31. Each RSU 31 includes a fluid-filled wheel 32 formed of a compliant material 33 that deforms to establish a contact surface when the wheel 32 is in contact with and pressed against the rail 30. The fluid filled wheel 32 is mounted on an axle 35 attached to the RSU frame so that the fluid filled wheel 32 contacts the rail 30 as the bogie/carriage 21 passes over or is pulled along the rail track. The RSU 31 may include many ultrasonic individual ultrasonic probes or transducers 36 and includes at least one zero degree ultrasonic transducer 37 mounted inside the fluid filled wheel 32. The zero degree ultrasonic transducer 37 is configured and positioned for transmitting ultrasonic beams through the fluid in the wheel 32 and through the contact surface 38 of rail head 10 into the rail 30 and for receiving a reflected or return beam from the rail 30. The transducers 36 generate return signals that are transmitted to a data processing system 45 (FIG. 14).

Figure 15:
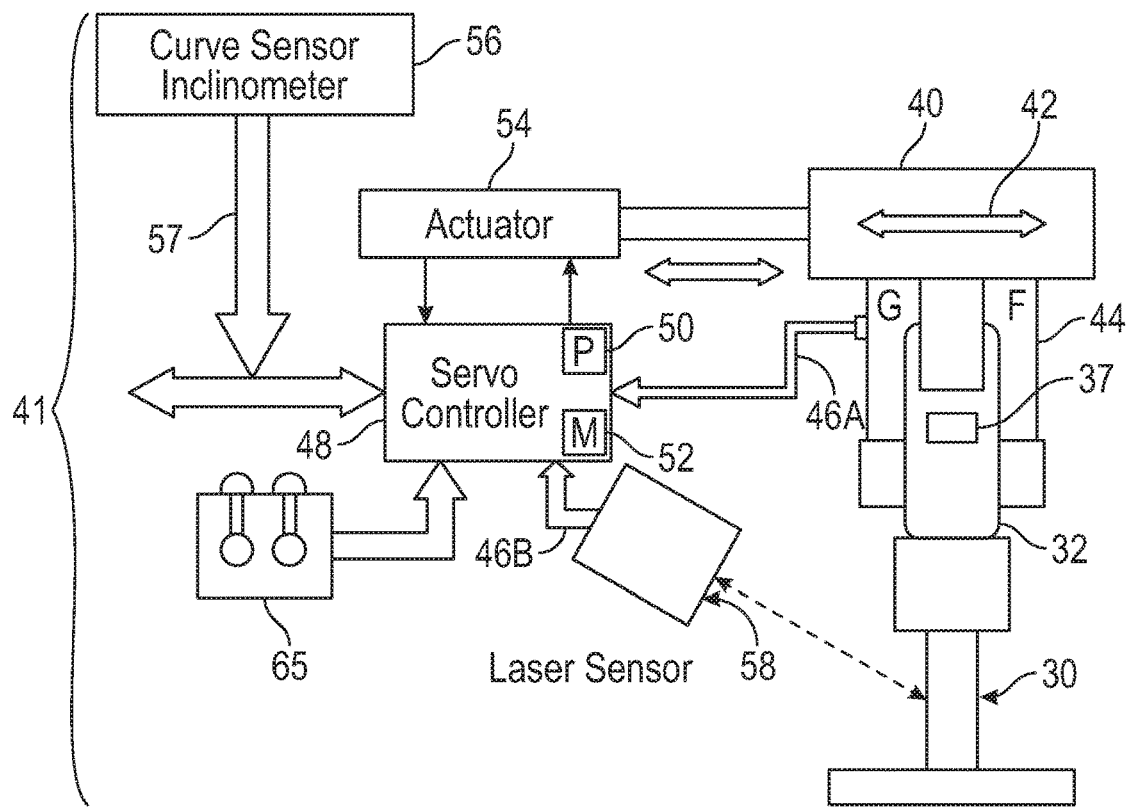
FIG. 15 is schematic view of a servo control for a single rail system according to an embodiment of the invention.
Figure 16:
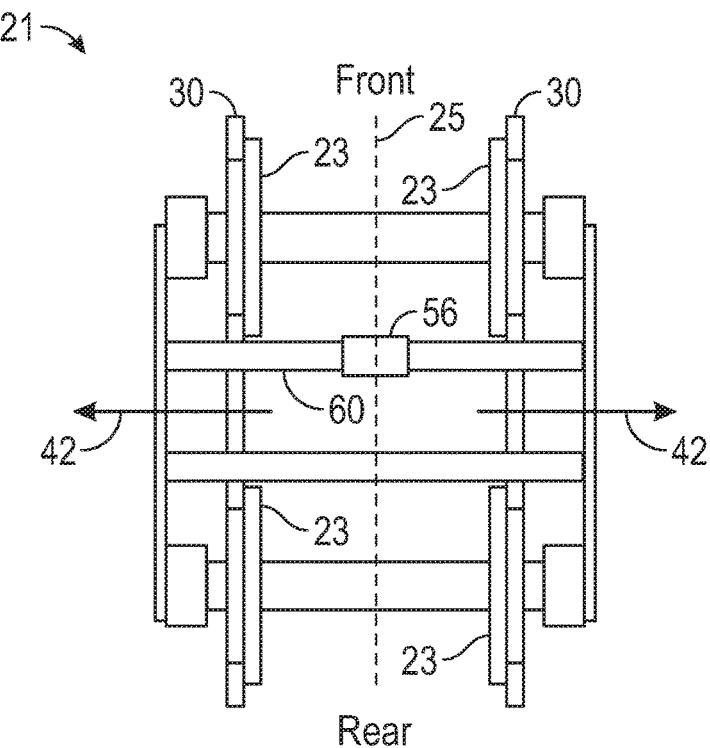
FIG. 16 is a schematic top view of the bogie mounted sensor system of FIG. 12 according to an embodiment of the invention.

Referring now to FIG. 15, the signals from Linear Velocity Displacement Transducer (LVDT) 44 and Laser 58 rail position sensors are used to establish the normal center line of the rail 30 and these are processed without the any influence of a curvature sensor 56 while the radius of the curve is greater than 1000 M (0.62 mile).

In an embodiment, the laser system 58 is an optical sensor that measures a distance to a location on the rail 26 using a laser or other light source. A portion of the laser light is reflected back and received by a photosensitive sensor, such as a photodiode for example. Based on this measured distance, a position of the ultrasonic transducer 36 relative to the center of the rail 30 may be estimated. It should be appreciated that while embodiments herein refer to the laser guidance system.

Figure 9B:
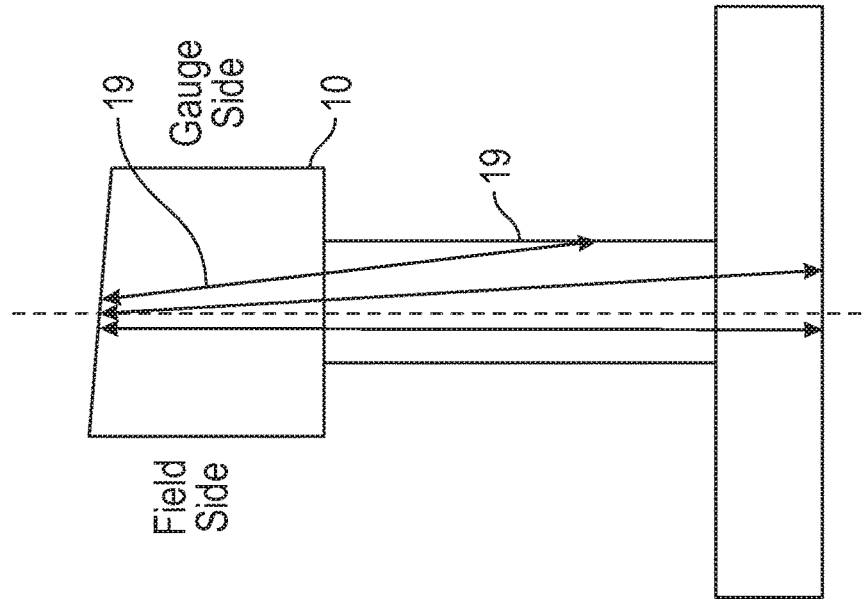
FIG. 9A shows a cross sectional view off the path of the Zero Degree Probe in none head worn rail and FIG. 9B the path in typical curved rail with head wear and how the ultrasonic beam is deflected away from the normal zero degree ultrasonic center line due to rail head wear that occurs in curves with a radius less than 1000 M.
Figure 9A:
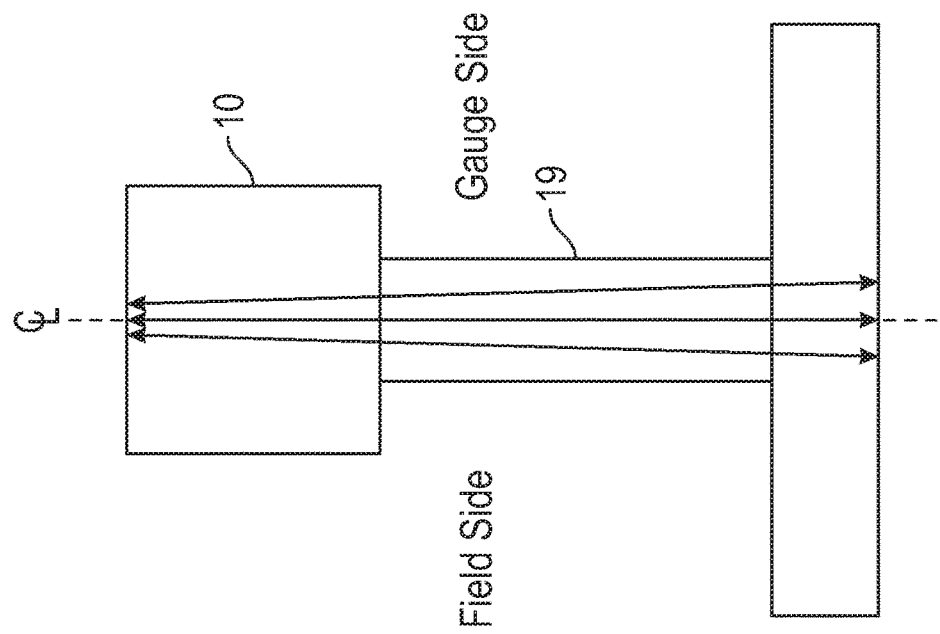

If the curvature sensor 56 output signal 59 indicates that the curve radius is less 1000 M (0.62 mile), then the output signal 59 is used by a servo controller 48 to progressively offset the nominal center position of the wheel 32 that has been determined or measured by either the Linear Velocity Displacement Transducer (LVDT) Sensor 44, laser 58 or other rail center line measurement sensors (e.g. optical measurements of the rail 30). It should be appreciated that dependent on the direction of the curve and individual rails the corrective action applied to the lateral movement will differ. For example, when the rail 30 is a left hand curve, the left hand side rails guidance system will be offset towards the gauge side of the rail 30 and the right hand side rail will be offset to the field side of the rail 30 (FIG. 9A), conversely for a right hand curve the left hand side rail will be offset to the field side of the rail and the right hand side rail to the gauge side of the rail. In the exemplary embodiment, these lateral corrections of the position of the wheel 32 and the electro mechanical servo assembly 40, 42 and 52 are automatically completed by the servo controller.

Referring now to FIG. 14, a schematic embodiment is shown of the ultrasonic inspection sensor system 45. This system includes the ultrasonic roller search unit (RSU) sensors 39 that is made up from a plurality of fluid-filled wheels 32 that are mounted to the side frames 40.

Referring now to FIG. 15, in an embodiment attached to each of the bogie/carriage side frames (left/right side) is a servo control system 41 which all the RSU sensors 39 on each side of the bogie/carriage 21 are suspended. In other words, there is an RSU sensor 39 and a servo control system 41 associated with each rail 30 of the railway being inspected. The each of the servo control systems 41 are configured to independently guide the respective left hand and right hand RSU sensor 39 down the center line of the rail 30. The servo control system laterally adjusts position the RSU sensor 39 so that it to moves across the head of the rail 30 in the directions indicated by arrow 42. It should be appreciated that the two independent servo control systems 48 may be coupled or linked via the curvature sensor 56. It should also be appreciated that when the bogie/carriage 21 is located on a straight section of rail track, the direction 42 may be substantially perpendicular to the track and the direction of motion. In other words, with further reference to FIG. 13A-13C, FIG. 16 and FIG. 17, the direction of the bogie/carriage 21 is substantially perpendicular to a longitudinal axis 25 of the carriage 21 or parallel with the axis 27 of the wheels 23. In an embodiment, the RSU 32 includes ultrasonic transducers 36 that are disposed within a fluid filled wheel or tire 32 (FIG. 13). Within each RSU 32, the plurality of transducers 36 include at least one of zero-degree transducer 37.

The ultrasonic signals emitted from the plurality of transducers 36 within the RSU 32 are coupled into the rail 30 using a water that is sprayed on to the upper surface 38 of the rail head 10. The signal/beam path for the plurality of the transducers 36 is shown diagrammatically as beams in the rail side/end views of FIG. 13A and FIG. 13B. To ensure the RSU's 32 are tracking the rail center line the system 45 (FIG. 14) has an integrated signal monitoring system that continually tracks the ultrasonic signal received back from the rail base 34 (FIG. 13) of the zero degree transducer 37. In the event that this signal is lost either due to poor RSU 32 tracking along the rail 30 or due to the lack of effective ultrasonic coupling of the zero degree transducer 37 into the rail 30, the system 45 will then determine and record this as a section of untested rail.

Figure 8:
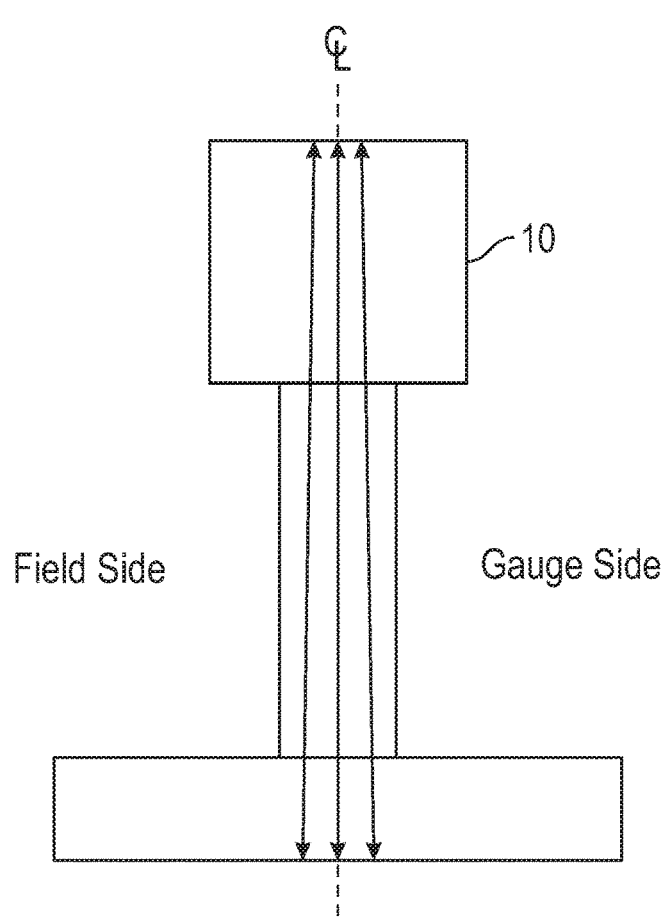
FIG. 8 is a cross sectional view of a section of new rail showing the normal zero degree ultrasonic center line according to an embodiment of the invention.
Figure 18:
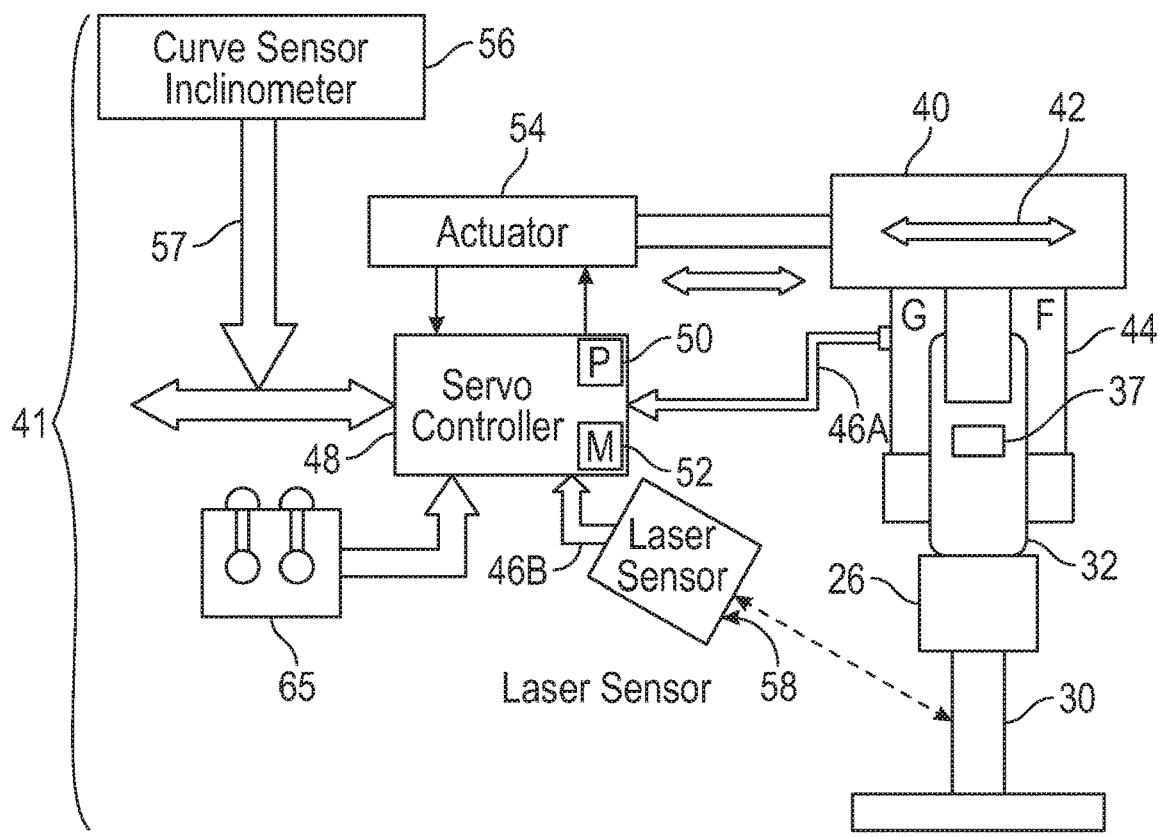
FIG. 18 is a schematic view of the adaptive guidance system for controlling an ultrasonic roller search unit (RSU) or slider probe according to an embodiment according to an embodiment of the invention.

Referring to FIG. 15, in an embodiment each rail 30 (left and right) has its own individual servo control system 45. To ensure that each set/side of RSU 32 follow the center line of the rail 30 one of two or more rail positioning sensors are deployed, such as Laser sensor 58 or the Linear Velocity Displacement Transducer (LVDT) sensor 44, or as combination thereof, also other rail position sensors/systems may also be used such as rail profile measurement system or a mechanical gauging test carriage or axle etc. All of these sensor or measurement systems are configured to provide that the RSU 32 are guided down the center line of the rail 30 and maintain a reliable rail base indication from the zero degree transducer 37. In an embodiment, all the electronic rail center line measurement systems are configured to generate an error signal 46 in event that the bogie/test carriage mechanics moves the RSU 32 away from the center line of the rail or the position of the rail 30 relative to the RSU 32 changes due to a change in the distance between the right and left rails as the vehicle 20 (FIG. 10) progresses along the track. The error signal 46 generated in response to movement away of the RSU 32 from the center of the rail, is then processed by the servo controller 48 and used to provide drive signals that cause the servo actuator 54 mechanically (linearly) translate or move a frame 40 to which the RSUs 32 are mounted from in order to reduce the rail position sensor error signal and therefore re-align the RSUs 32 with the Rail Center Line (FIG. 8). In an embodiment, manual joysticks 65 are provided to allow the operator to manually offset the RSUs 32 to offset from the nominal rail center position and to accommodate heavily side worn rail conditions 26 (FIG. 18).

Figure 2C:
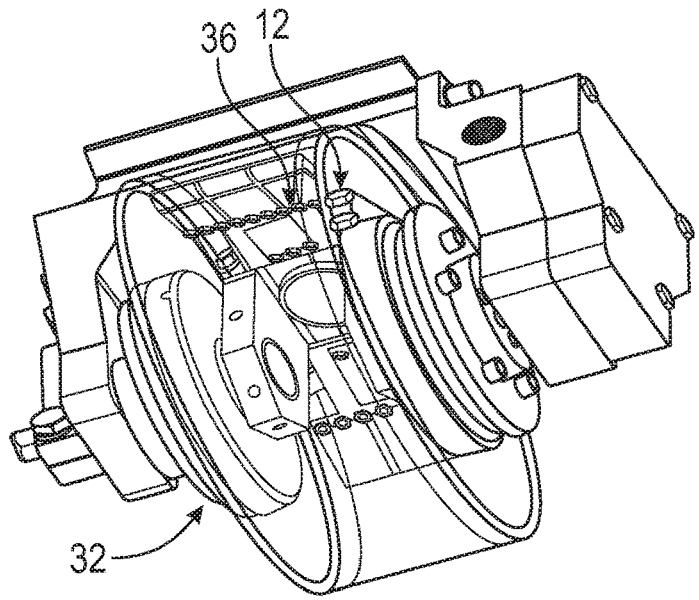
Figure 3:
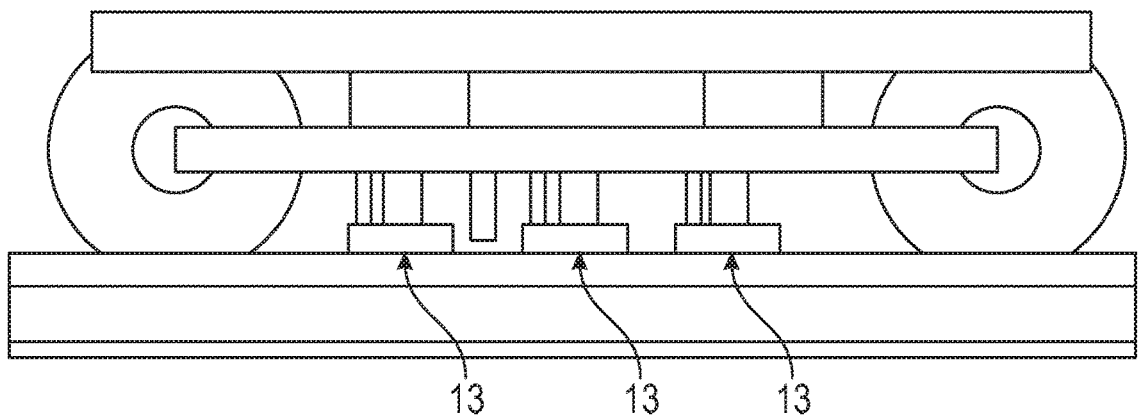
FIG. 3 is a side view of a rail and the deployment of a Slider Probe according to an embodiment of the invention.
Figure 4:
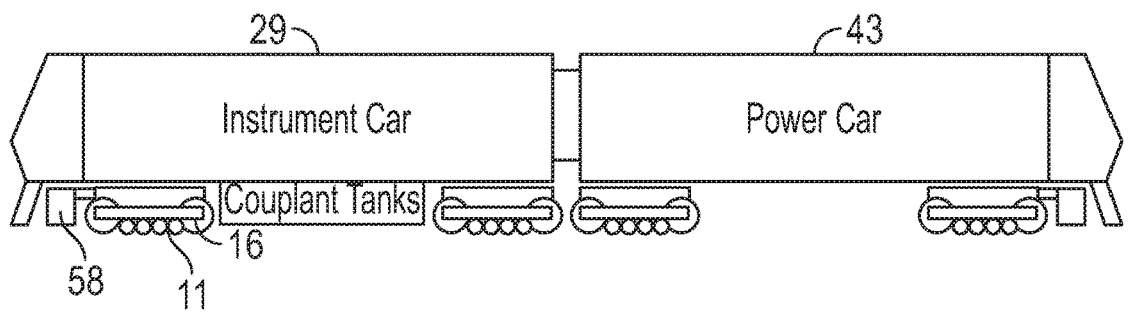
FIG. 4 is a schematic view of a typical mobile rail bound inspection vehicle showing the different options of deploying the various sensor systems according to an embodiment of the invention.
Figure 5:
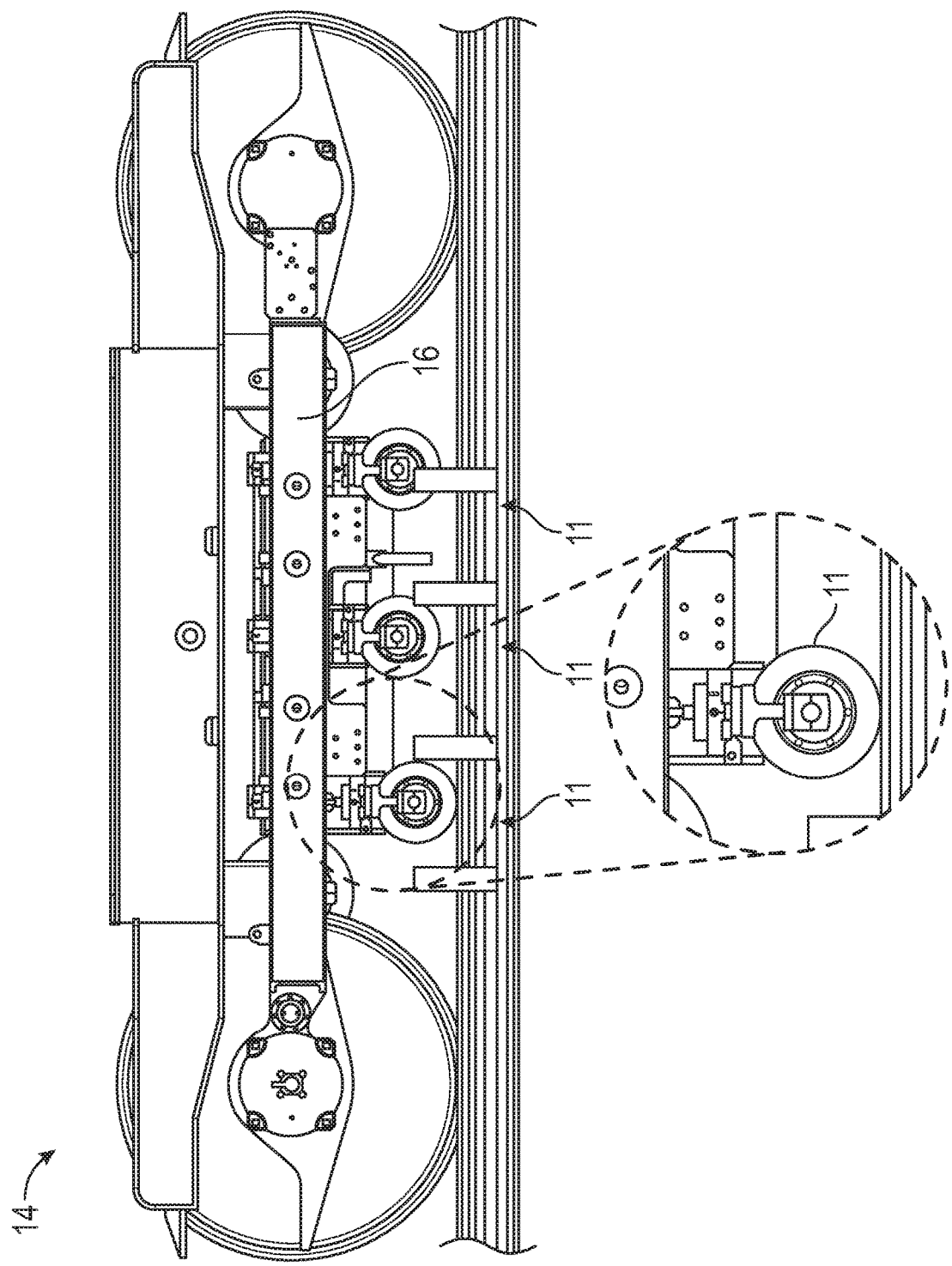
FIG. 5 is a schematic view of a typical rail bound bogie deployment system showing how Ultrasonic Roller Search Units or Slider Probes may be mounted to an embodiment of the invention.
Figure 6:
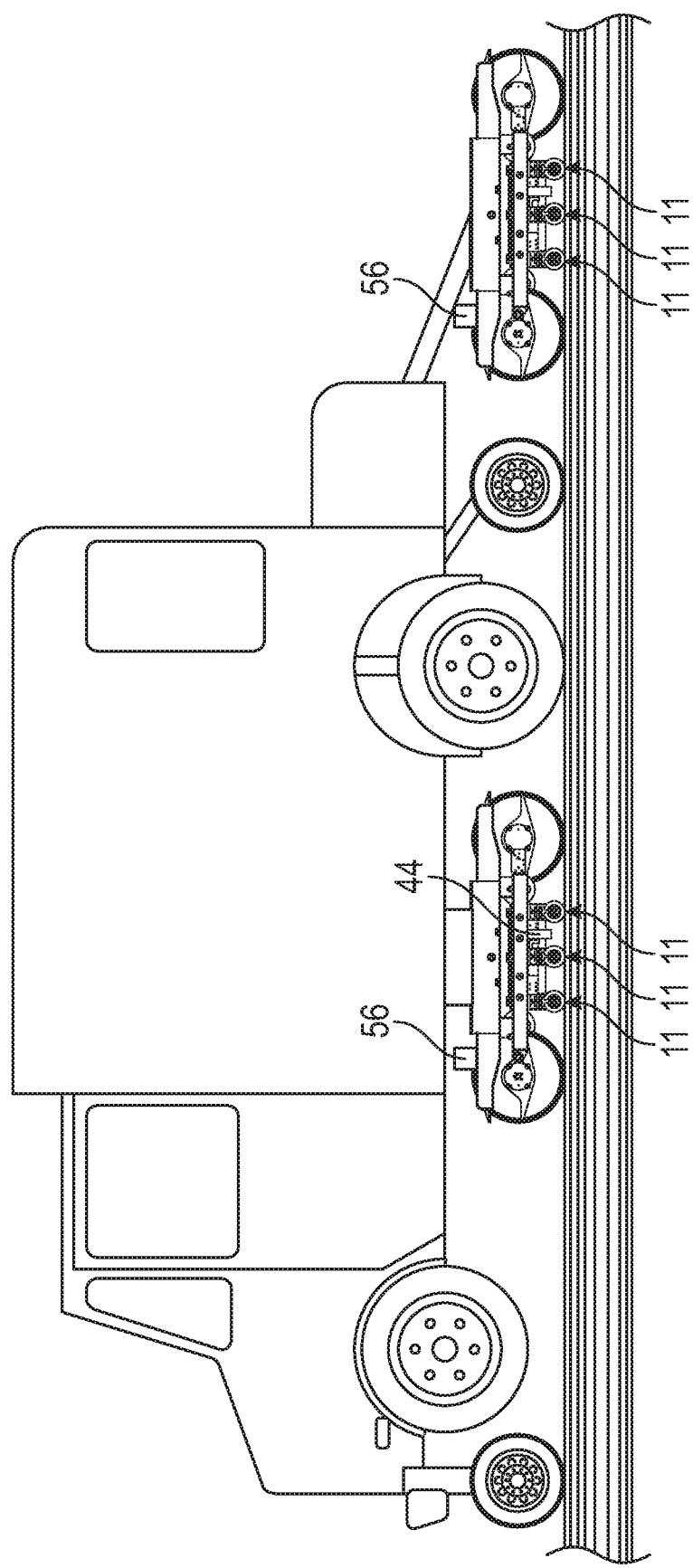
FIG. 6 is a schematic view of a typical Hi Rail/Road Rail Vehicle inspection vehicle showing the different options of deploying the various sensor system according to an embodiment of the invention.
Figure 7:
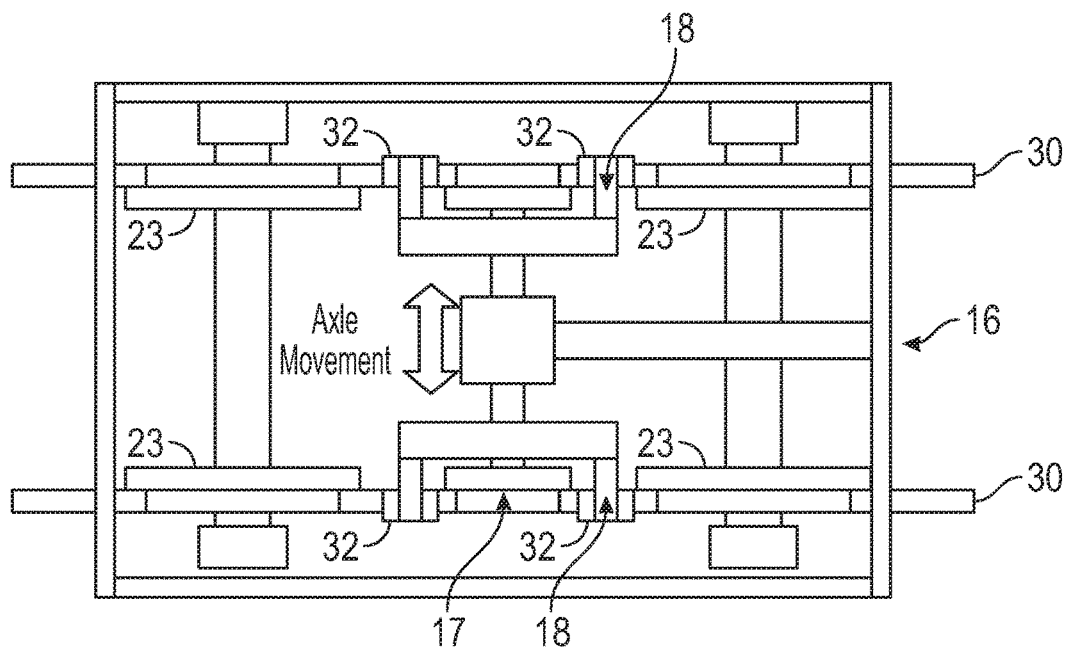
FIG. 7 is a plan schematic view of a typical Gauging Axle Rail Tracking System showing how the Ultrasonic Roller Search Units or Slider Probes may be mounted to an embodiment of the invention.
Figure 19A:
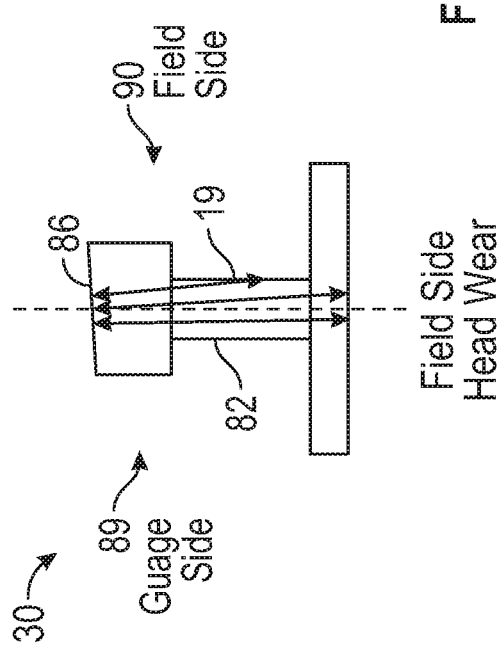
FIG. 19A, 19B, 19C and FIG. 19D illustrate schematic examples of rail wear that occurs and reflection (refraction) of the zero degree ultrasonic sensor's beam on each rail in left hand and right hand curves according to an embodiment of the invention.
Figure 19B:
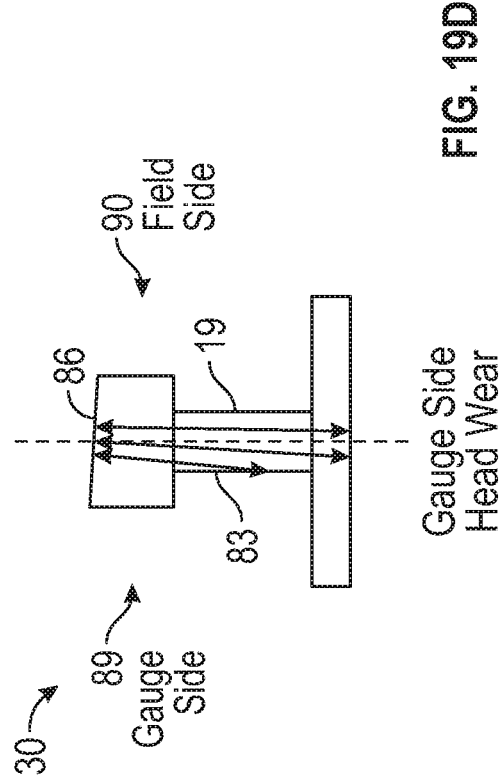
Figure 19C:
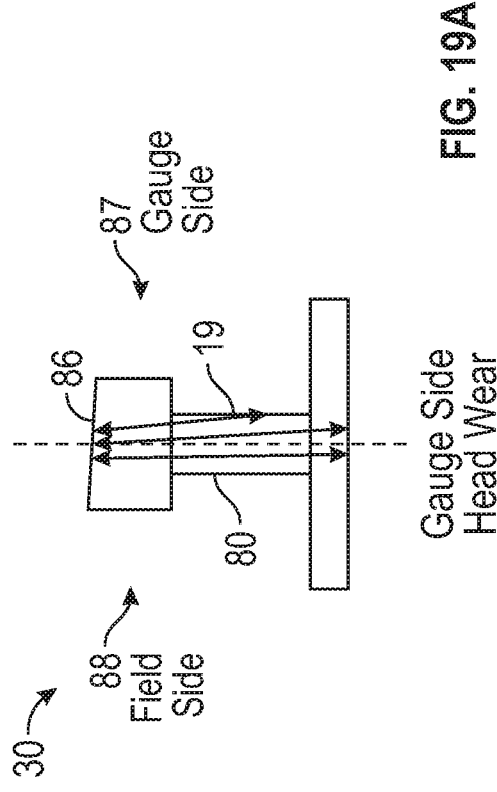
Figure 19D:
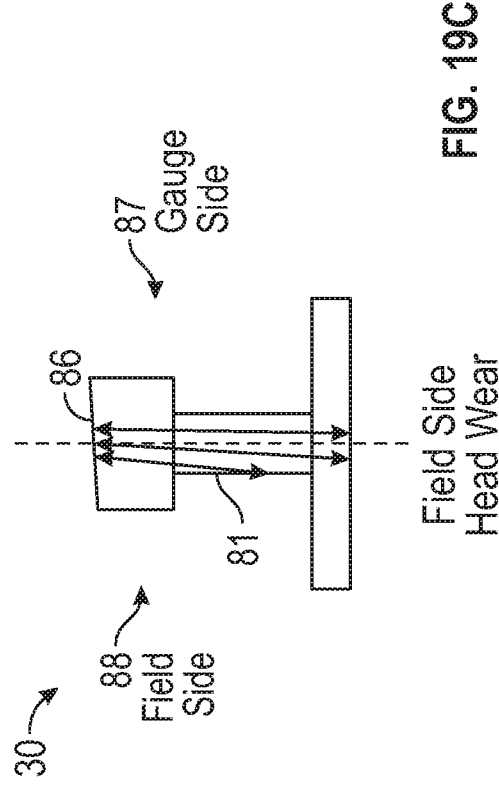
Figure 20A:
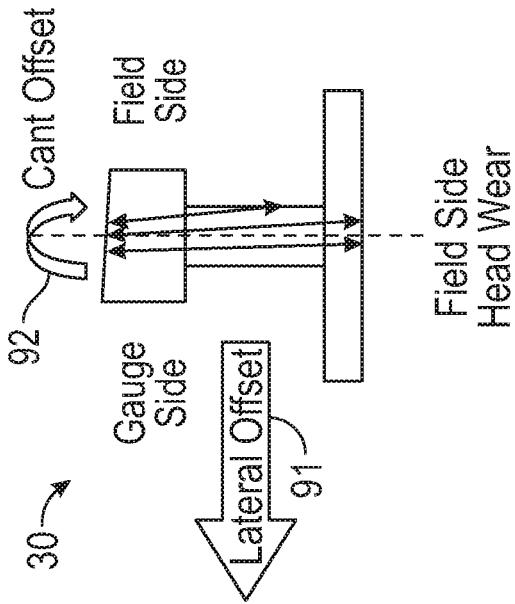
FIG. 20A, 20B, 20C and FIG. 20D illustrate schematic examples the lateral and cant offset corrections applied to correct for the ultrasonic beam deflection caused by rail head wear in left hand and right hand curves according to an embodiment of the invention.
Figure 20B:
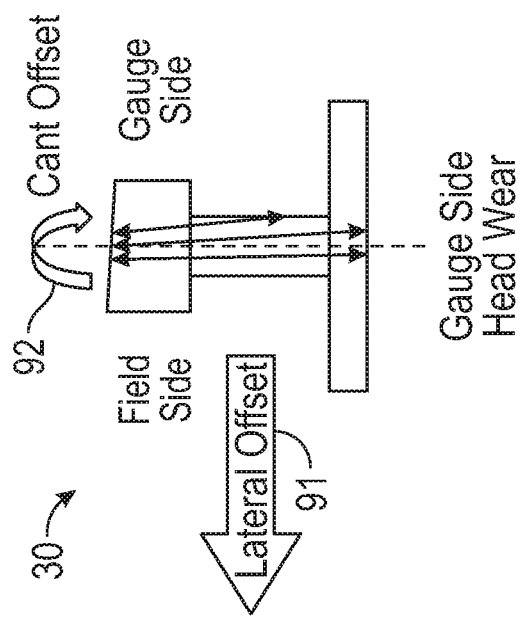
Figure 20C:
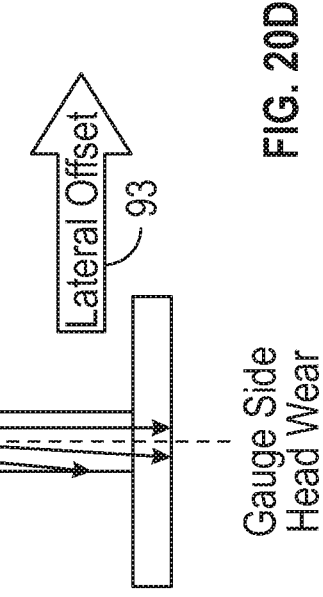
Figure 20D:
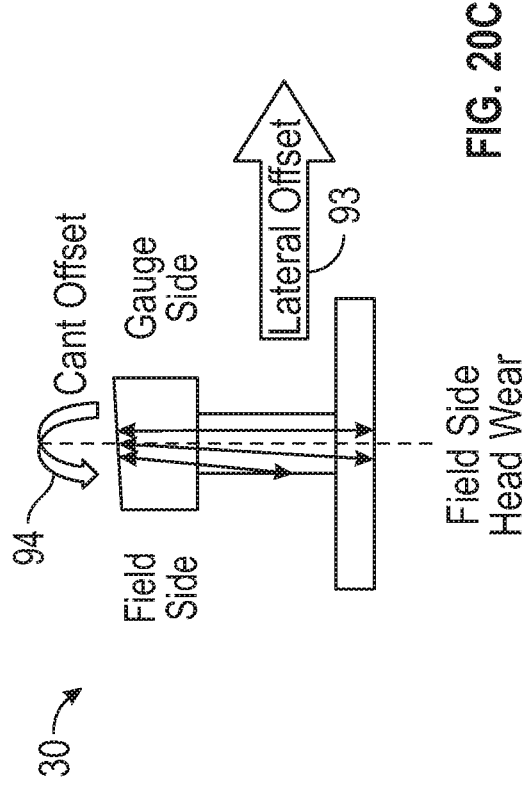

It has been found that when a generic ultrasonic mobile inspection vehicle (FIG. 4 or FIG. 6) equipped with either a bogie (FIG. 5) or test carriage 1 or 2 (FIG. 6) or gauging axle (FIG. 7) are used to provide ultrasonic probe deployment system, whether the probe guidance/tracking system is electrical or mechanical, an ultrasonic performance issue is often experienced when inspecting curves with a radius that is typically greater than 1000 M. This performance issue is related to not being able to maintain a reliable return signal using the zero degree transducer 37. As a result, these systems report that the rail in question as untestable. It is has been discovered that this lack of performance cannot be directly attributed to the RSU 32 tracking or the dynamic response of the control system, rather it has now been found that the untestable rail situation is due to the zero degree transducer 37 beam 19 being refracted away from the center line of the rail (FIG. 9A, FIG. 9B), this refraction then causes a reduction in the amplitude of the return zero degree transducer signal and hence the system reports the situation as untested rail. The wear that occurs in this situation normally occurs on both rails in either right hand or left hand curves and is shown in FIG. 19A-19D. As shown in FIG. 19A and FIG. 19C, the rail 80 and rail 81 are on the left hand side of the vehicle and as shown in FIG. 19B and FIG. 19D, the rail 82 and rail 83 are on the right side of the vehicle. As shown in FIGS. 19A-19D it has been discovered that the rail head wear pattern 86 for a right hand curve 84 (FIG. 19A, FIG. 19B) will cause the zero degree transducer's beam 19 on the left hand rail 80 to be refracted away from the rail center towards the gauge side 87 of the rail and towards the field side 90 of the right hand rail. Conversely it has been discovered that the rail head wear pattern 86 for a left hand curve (FIG. 19C, FIG. 19D) will cause the zero degree transducer's beam 19 on the left hand rail 81 (FIG. 19C) to be refracted away from the rail center towards the field side 88 and towards the gauge side of the right hand rail 89.

It is known the effects of rail head wear in curves on the refraction of the zero degree transducer beam 19 can be manually compensated for by either laterally offsetting in a direction indicated by arrow 91 or arrow 93 (FIG. 20A-20D) or adjusting the cant-angle-offset 92 or cant-angle-offset 94 (FIG. 20A-20D) the RSU 32 in the desired direction using the servo control system 41 (FIG. 18) manual joystick controls 65. The effect of making these adjustments is shown in FIGS. 21A-21D and it should be appreciated that this would then significantly reduce the amount of reported untestable rail caused by the loss of the reflected signals 37 from the zero degree probe. However, the main drawback of this manual offset process is that the vehicle operators can only manually compensate for the issue once it has been detected and the same adjustment but in the opposite direction will be required once the vehicle has exited the curve.

With the ultrasonic rail inspection speeds being up to 80 kph (50 mph) it can be appreciated that if it takes even a few seconds for the manual adjustment process to be completed many meters of track may be reported as untested. It should be appreciated that embodiments of the present invention provide advantages in of automatically making the tracking adjustments to compensate for the curved track rail head profile wear without the need for any manual operator intervention.

Another desirable feature of a curvature guidance compensation system is for it to provide the required correction in various weather conditions that are experienced throughout the world. This includes rain, snow, sand, wind and many other less specific conditions. Embodiments of the present invention provide advantages in being able to measure the track curvature when only the top surface of the rail head is exposed (e.g. high grass/weeds, deep snow, high ballast, or testing through rail road/level crossings).

In some embodiments, the servo control system 41 may further include one or more additional measurement curve sensor's, that either directly or indirectly measure the curvature of the rail track.

Figure 22:
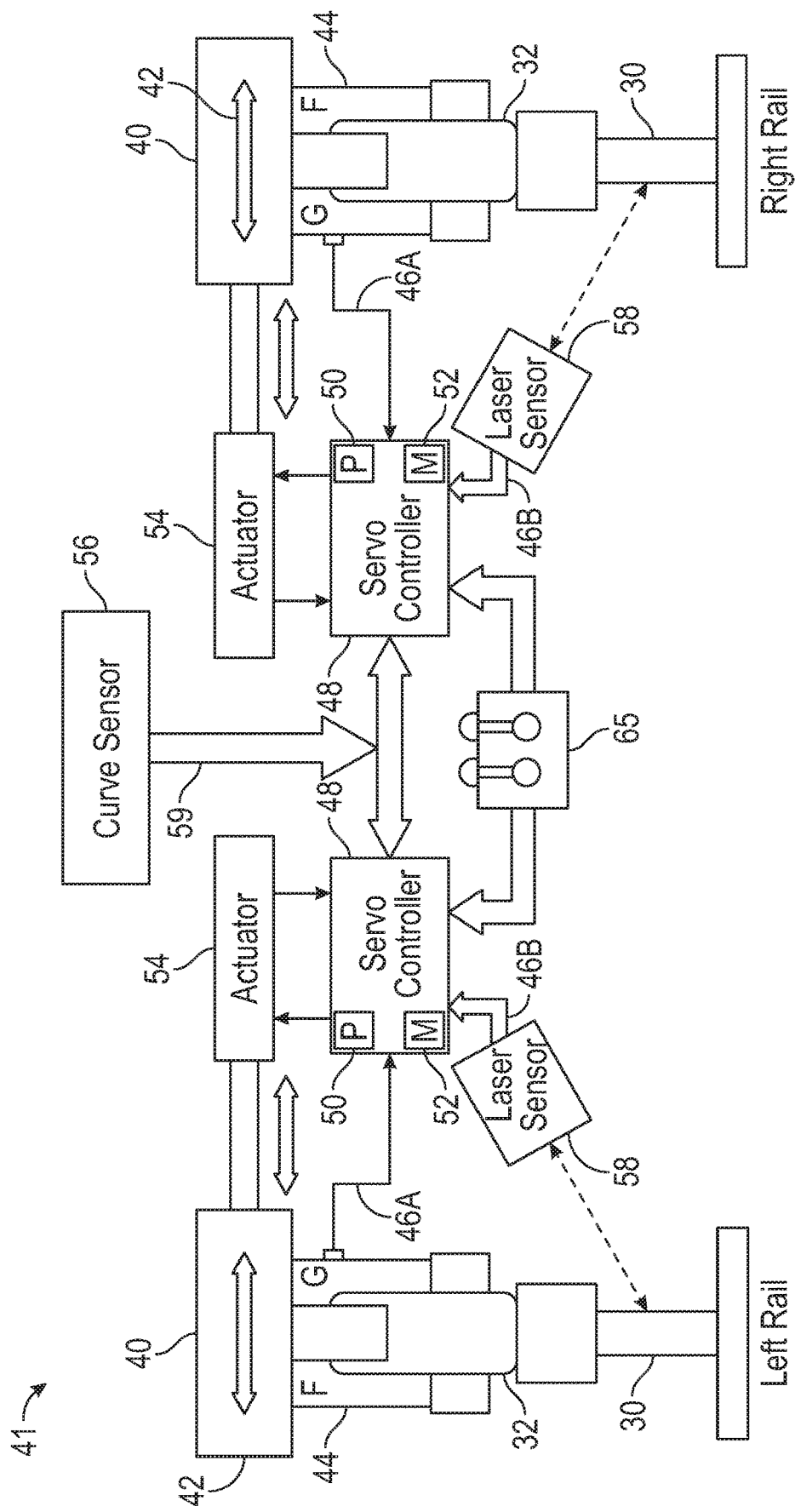
FIG. 22 illustrates a schematic block diagram of the complete Adaptive Guidance System when it is testing tangent non curved track according to an embodiment of the invention.

Referring now to FIG. 22, a system 41 is shown that addresses issues related to providing automatic RSU 32 positional correction to compensate for the ultrasonic effects of rail head wear in railway curves. The system 41 provides an indication of the components used to control the position of the RSU 32 on both sides of the vehicle (Left and Right Rails 30). In an embodiment, the system 41 uses a curvature sensor 56 and in cooperation with guidance application software that resides memory 52 in each of left and right servo controllers 48 and is executed on the respective processor 50 in each of the individual servo controllers 48.

In an embodiment, the curve sensor 56 is mounted centrally on the test carriage cross beam 60 (FIG. 16, FIG. 17) and this is used to measure either directly or indirectly, the radius of curvature of the railway track 30 by the implied angle of inclination 57 (FIG. 17) that is measured by the curvature sensor 56. The curvature sensor 56 may include be based on an electro-mechanical or optical sensor technology or a combination of the foregoing. The curvature sensor 56 measures an angle 57 that the carriage 21 (FIG. 17) is resting or traveling relative to a horizontal plane (e.g. a plane perpendicular to the direction of gravity). In other words, when the railroad track bed is angled, or banked, the curvature sensor 56 will measure the angle based on the angle or tilt of the carriage 21. The curvature sensor may be any suitable angle measuring device, such as a single axis curvature sensor 56 for example that measures angles up to +/−15 degrees.

As shown in FIG. 22, the curvature sensor 56 output angular inclination measurement signal 59 is feed into both the left and right servo controllers 48. This signal is then processed by the servo controllers 48 in accordance with a method 100 shown in FIG. 26, which modifies the rail tracking error signals 46A, 46B, from either the Linear Velocity Displacement Transducer (LVDT) sensor 44 or the Laser rail tracking sensor 58.

Figure 23:
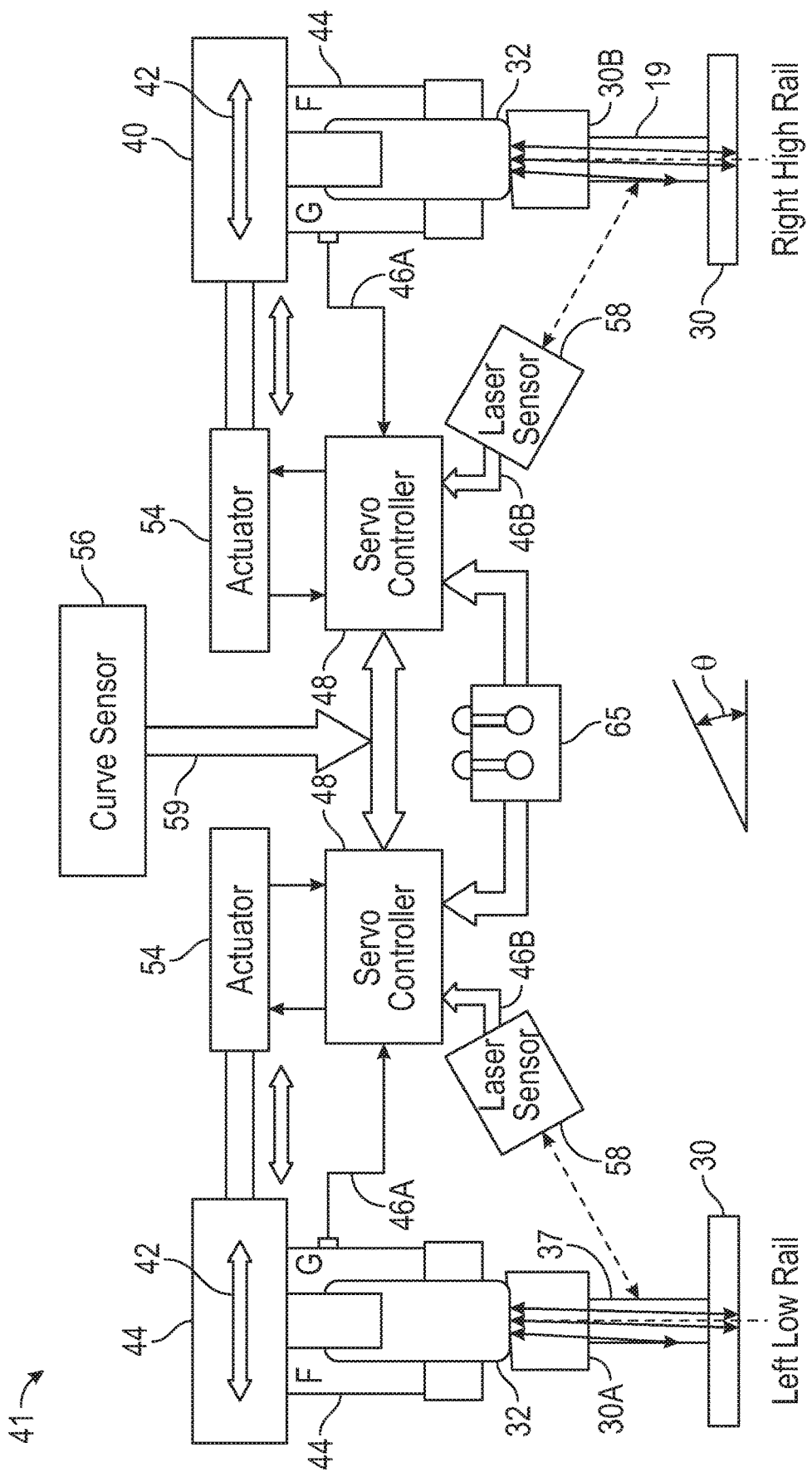
FIG. 23 illustrates a schematic block diagram of the adaptive guidance system when first passes over curved track with rail head wear according to an embodiment of the invention.
Figure 24:
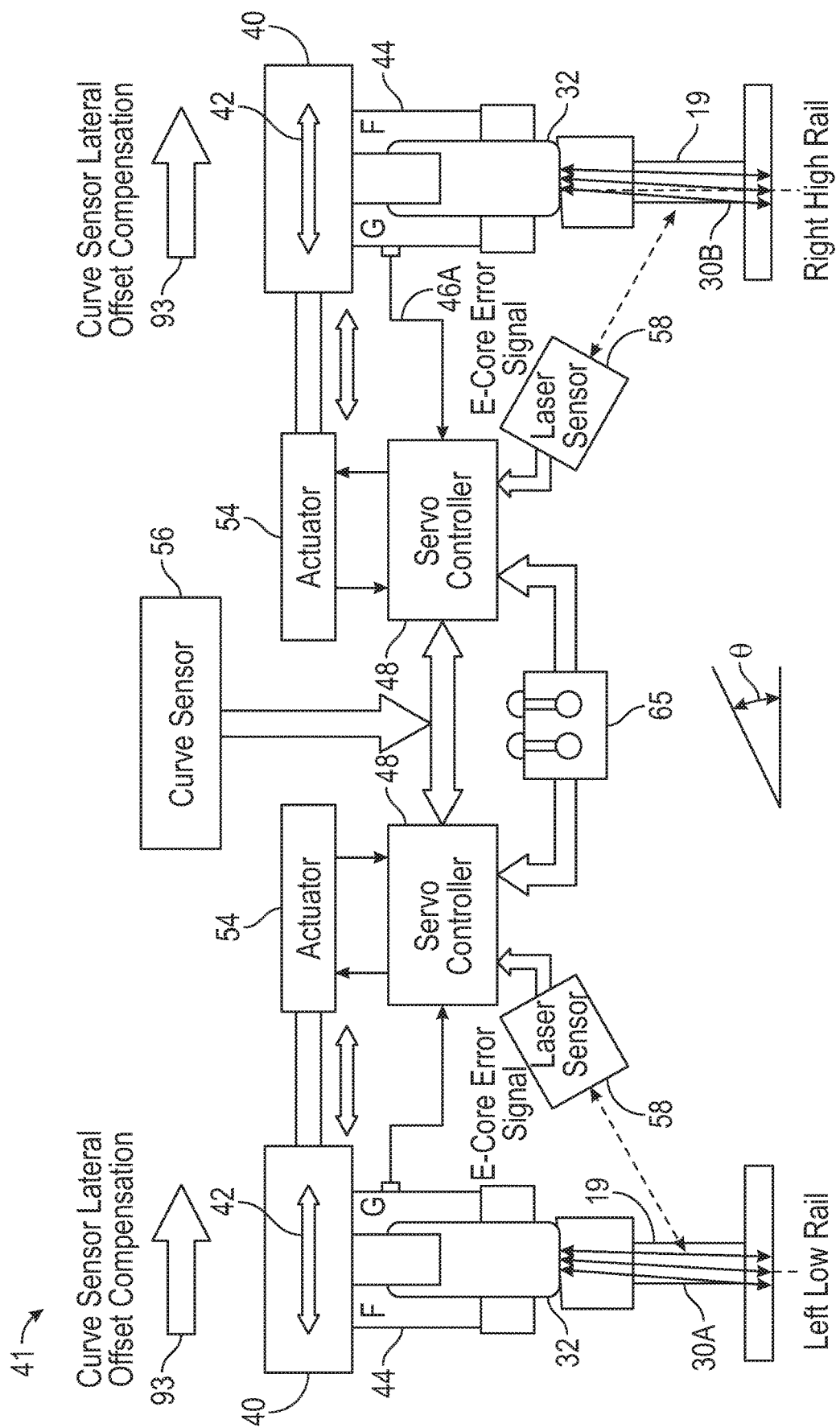
FIG. 24 illustrates a schematic block diagram of the adaptive guidance system applying the a lateral offset for a left hand curve with rail head wear to realign the beam from the zero degree sensor according to an embodiment of the invention.
Figure 25:
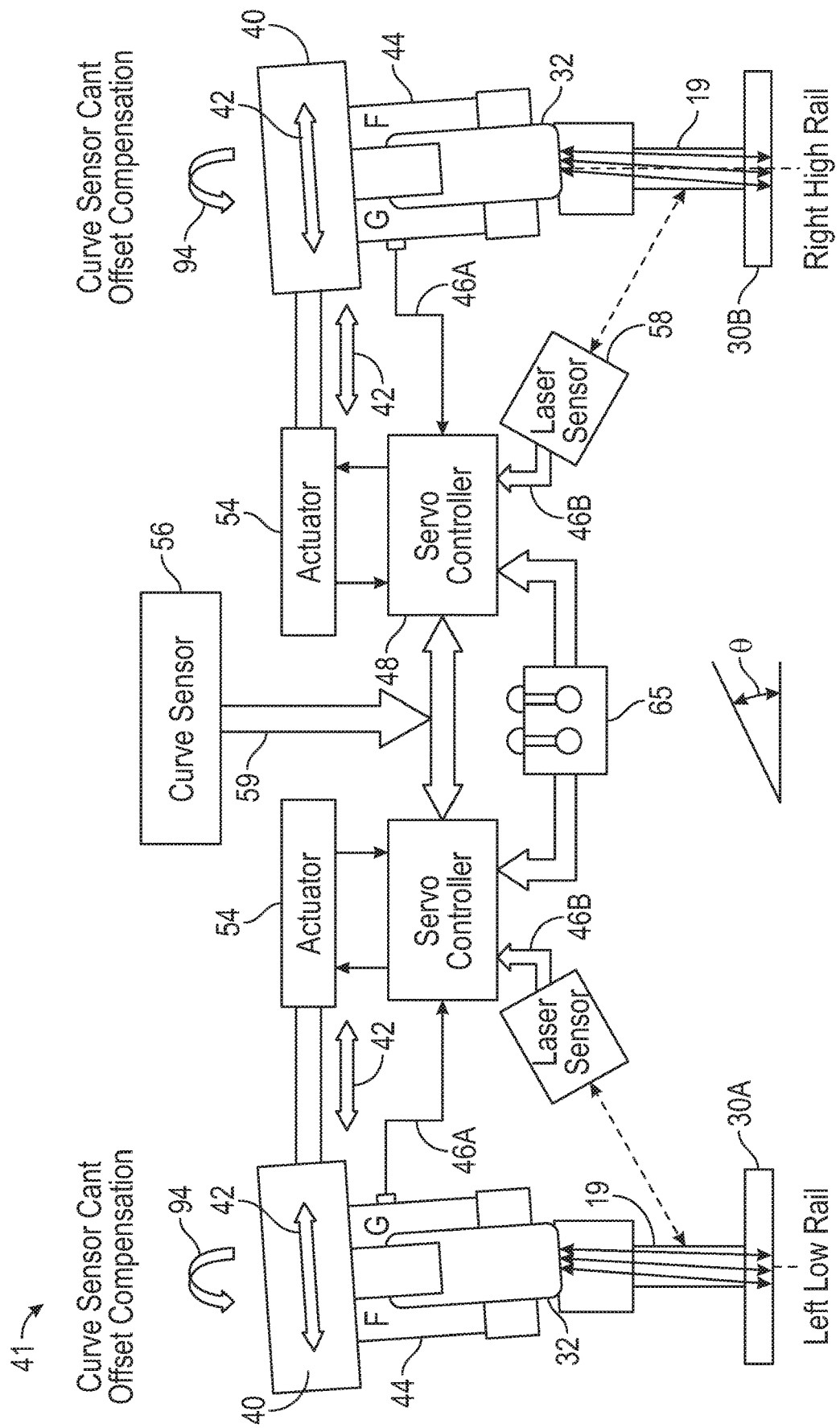
FIG. 25 illustrates a schematic block diagram of the adaptive guidance system as in FIG. 24 with the corrective offset applied by adjusting the RSU Cant according to an embodiment of the invention.

Referring now to FIGS. 23-25 show how the required RSU tracking is automatically modified based on the output of the curvature sensor 56 and the left and right servo controllers 48 pre/post the correction process for a left hand curve with rail head wear. In this embodiment, the carriage 21 is tilted at an angle θ such that the left rail 30A is lower than then right rail 30B. FIG. 23 shows the impact of the rail head wear prior to any offset correction process. FIG. 24 shows how the correction process can be applied by laterally offsetting in the direction of arrow 93 the RSU's 32 and FIG. 25 shows how the correction process can be applied by changing the cant angle indicated by arrow 94 the RSU's 32.

The control error signal 46A, 46B may be based on measurements performed by the Linear Velocity Displacement Transducer (LVDT) sensor 44 or the Laser tracking sensor 58, or a combination of the foregoing. The control error signals 46A, 46B are transmitted to a servo controller 48 that actuates and controls the position of an actuator 54. In the exemplary embodiment, the actuator 54 is a linear actuator configured to move in a lateral direction, such as a direction indicated by arrow 42 for example but could also be applied in a similar method by adjusting the cant angle with a rotational movement of the RSU 32 as indicated by arrow 94.

The servo controller 48 is a suitable electronic device capable of accepting data and instructions, executing the instructions to process the data, and presenting the results.

Servo controller 48 may accept instructions through user interface, or through other means such as but not limited to electronic data card, voice activation means, manually-operable selection and control means, radiated wavelength and electronic or electrical transfer. Servo controller 48 includes a processor 50 coupled to memory 52, such as a random access memory (RAM) device, a non-volatile memory (NVM) device, a read-only memory (ROM) device, one or more input/output (I/O) controllers, and in some embodiments a local area network (LAN) interface device.

The Servo controller 48 is capable of converting the analog voltage or current level provided by ultrasonic detector assembly 44, curvature sensor 56 and laser rail tracking sensor 58 into a digital signal indicative of the quality or strength of the return signal to the ultrasonic transducer 37. The servo controller 48 uses the digital signals act as input to various processes for controlling the ultrasonic sensor system.

In general, the servo controller 48 accepts data from the Linear Velocity Displacement Transducer (LVDT) sensor 44, the curvature sensor 56, and the laser rail tracking sensor 58. The servo controller 48 is given certain instructions for the purpose of comparing the data from sensors 44, 56, 58 to predetermined operational parameters. The servo controller 48 provides operating signals to actuator 54 to change the lateral position or cant angle position of the side frame 40 and thus the position of the RSU 32 and the ultrasonic transducer 37 relative to the rail 30. In an embodiment, the servo controller 48 compares the operational parameters to predetermined variances (e.g. voltage greater than or less than a predetermined value) and if the predetermined variance is exceeded, generates a signal that may be used to indicate an alarm to an operator or a computer network.

Figure 17:
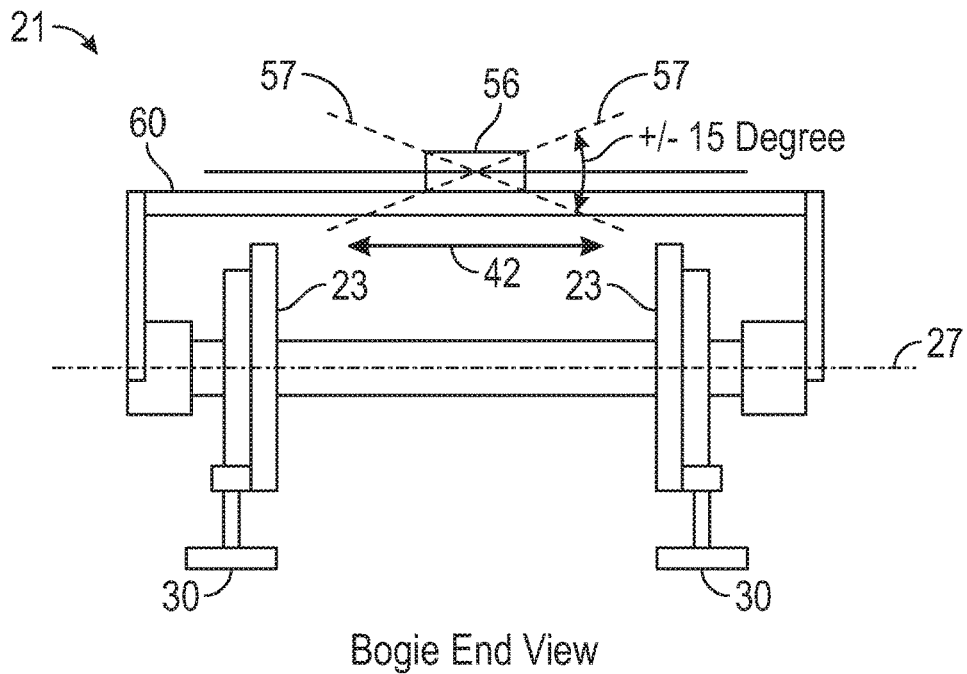
FIG. 17 is a schematic end view of the bogie mounted sensor system of FIG. 12 according to an embodiment of the invention.

In an embodiment the servo controller 48 receives a signal from the curvature sensor 56 that measures the angle of a cross-frame member 60. In an embodiment, the cross-frame member 60 is parallel with the direction 42 (FIG. 17). As a result, the curvature sensor measures angle, tilt or banking of the ground that the rails 30 are placed (e.g. angle measured relative to a horizontal plane). It has been found that the radius of curvature of the rail may be estimated based on the angle or tilt of the surface on which the rails are placed. Thus, based on historical data of surface angle vs rail radius of curvature, the servo controller 48 may estimate the rail curvature based on the angle measured by the curvature sensor 56.

Figure 26:
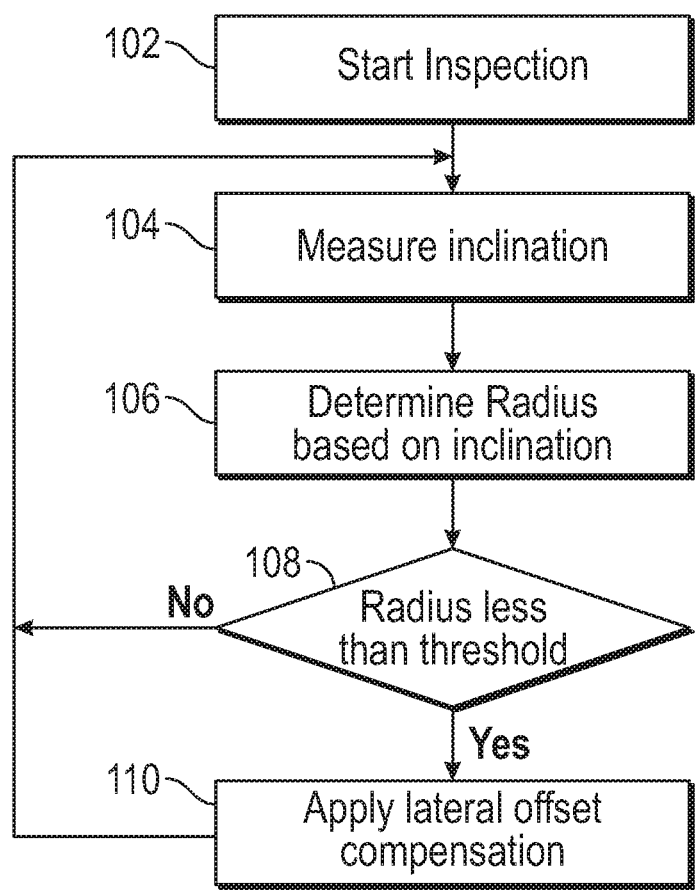
FIG. 26 is a flow diagram illustrating a method of operating the rail inspection system according to an embodiment.

Referring now to FIG. 26, with continuing reference to FIG. 22, FIG. 23, FIG. 24 and FIG. 25, a method 100 is shown for inspecting the rails 34. The method 100 begins in block 102 where the inspection is started. This may include mounting the system 45 (FIG. 14) on the railroad track and either coupling the carriage 21 to a propulsion source, or initiating a propulsion source of the system 45. The method 100 then proceeds to block 104 where the angle of the curvature sensor 56 is measured relative to a horizontal plane. In an embodiment, a look-up table, a database, a model or other relationship of actual curvature angles and the corresponding inclinometer measurements that were measured while the vehicle passes over curves of known radius's is provided. The method 100 then proceeds to block 106 where the radius of the rail 26 is determined (e.g. via the look-up table). In an embodiment, the radius of the rail is correlated with a signal output (voltage) from the curvature sensor 56.

The method 100 then proceeds to query block 108 where it is determined whether the radius is less than a predetermined threshold, such as 1000 meters for example. When the query block 108 returns a negative (e.g. radius equal to or greater than 1000 meters), the method 100 loops back to block 104 and the process continues. When the query block 108 returns a positive (e.g. radius less than 1000 meters), the method 100 proceeds to block 110 where lateral offset compensation is applied.

As discussed herein, a technical effect of the offset compensation is to move the position of the RSU 32 to improve the reflection of the ultrasonic signal back to the zero-degree transducer to reduce the errors, sometimes referred to as Lack of Expected Response (LER) during the inspection without having manual intervention by the operator. Is should be appreciated that this compensation may be performed and provide advantages in improving the inspection rails independent of the speed of the carriage 21.

In still a further embodiment, the offset compensation is a function of both the curvature sensor 56 and the laser rail tracking sensor 58.

In still a further embodiment, the offset compensation is a function of both the curvature sensor 56 and the Linear Velocity Displacement Transducer (LVDT) sensor 44.

Technical effects and benefits of some embodiments include providing a system for inspecting a rail, such as that used in railroads, for undesired conditions using an ultrasonic signal. Further technical effects and benefits include the automatic adjustment of the position of an ultrasonic transducer during the inspection based on the curvature of the rail reduce or eliminate the reflection of the ultrasonic signal away from the transducer due to rail wear or deformation.

Throughout the specification and claims, the following terms take the meanings explicitly associated herein, unless the context clearly dictates otherwise. The term "connected" means a direct connection between the items connected, without any intermediate devices. The term "coupled" means either a direct connection between the items connected, or an indirect connection through one or more passive or active intermediary devices. The term "circuit" means either a single component or a multiplicity of components, either active and/or passive, that are coupled together to provide or perform a desired function. The term "signal" means at least one current, voltage, or data signal. The term "module" means a circuit (whether integrated or otherwise), a group of such circuits, a processor(s), a processor(s) implementing software, or a combination of a circuit (whether integrated or otherwise), a group of such circuits, a processor(s) and/or a processor(s) implementing software.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system for inspecting a rail, the system comprising:
   an ultrasonic transducer positioned to emit an ultrasonic beam onto the rail and receive a refraction beam, the ultrasonic transducer being movable between a first position and a second position;
   a curvature sensor operable to measure a change in angle of a carriage relative to a horizontal plane and determine a radius of the rail in response to the measured change in angle of the carriage relative to a horizontal plane; and
   a controller operably coupled to the sensor, the controller having a processor that is responsive to executable computer instructions when executed on the processor to cause the ultrasonic transducer to move to receive refraction beam in response to a determination that the radius of curvature of the rail is less than a predetermined first threshold.

2. The system of claim 1, wherein the movement of the ultrasonic transducer is a lateral offset relative to the rail.

3. The system of claim 1, wherein the movement of the ultrasonic transducer is a change of a cant angle.

4. The system of claim 1, wherein the controller causes the movement of the ultrasonic transducer is a progressive offset in response to the angle indicating a rail radius of less than a predetermined second threshold.

5. The system of claim 4, wherein the progressive offset increases as the rail curvature decreases.

6. The system of claim 1, further comprising:
   an ultrasonic detector assembly that includes the ultrasonic transducer, the ultrasonic detector assembly being configure to output a first error signal in response to receiving the refraction beam; and
   an actuator operably coupled to the ultrasonic detector assembly for moving the ultrasonic transducer between the first position and the second position; and
   wherein the controller is further responsive for causing the actuator to laterally offset the position of the ultrasonic based at least in part on the measured angle and the first error signal.

7. The system of claim 6, further comprising:
   an optical sensor operable to measure a characteristic of the rail and generate a second error signal in response; and
   wherein the controller is further responsive for causing the actuator to laterally offset the position of the ultrasonic based at least in part on the measured angle, the first error signal, and the second error signal.

8. The system of claim 7, wherein the optical sensor is a laser sensor.

9. The system of claim 7, wherein the optical sensor is a rail profile position sensor.

10. The system of claim 1, wherein the carriage has a cross-frame member disposed in a direction substantially perpendicular to the direction of movement of the carriage, the sensor being coupled to the cross-frame member.

11. A method of inspecting a rail, the method comprising:
    transmitting an ultrasonic beam into the rail with an ultrasonic transducer, the ultrasonic transducer being coupled to a carriage;
    receiving at the ultrasonic transducer a refraction beam reflected from the rail;
    measuring a change in angle of the carriage relative to a horizontal plane;
    determining a radius of the rail using the measured change in angle of the carriage relative to a horizontal plane; and
    moving the ultrasonic transducer relative to the rail based at least in part on determining that the radius of the rail is less than a first threshold.

12. The method of claim 11, wherein the movement of the ultrasonic transducer is a lateral offset relative to the rail.

13. The method of claim 11, wherein the movement of the ultrasonic transducer is a change of a cant angle.

14. The method of claim 11, wherein the movement of the ultrasonic transducer is a progressive offset in response to the angle indicating a rail radius of less than a predetermined second threshold.

15. The method of claim 14, wherein the progressive offset increases as the rail curvature decreases.

16. The method of claim 11, further comprising:
    outputting a first error signal in response to the ultrasonic transducer receiving the refraction beam; and
    wherein the movement is a lateral offset the position of the ultrasonic based at least in part on the measured angle and the first error signal.

17. The method of claim 16, further comprising:
    measuring a characteristic of the rail and generating a second error signal in response; and
    wherein the movement is a lateral offset the position of the ultrasonic based at least in part on the measured angle and the first error signal, and the second error signal.

18. The method of claim 17, wherein the characteristic is measured with an optical sensor.

19. The method of claim 18, wherein the optical sensor is one of a laser sensor or a rail profile position sensor.

20. The method of claim 11, wherein the carriage has a cross-frame member disposed in a direction substantially perpendicular to the direction of movement of the carriage, the sensor being coupled to the cross-frame member.

* * * * *